June 24, 1941.    M. P. BLOMBERG    2,247,273
FRAMING
Filed March 26, 1934    18 Sheets-Sheet 1
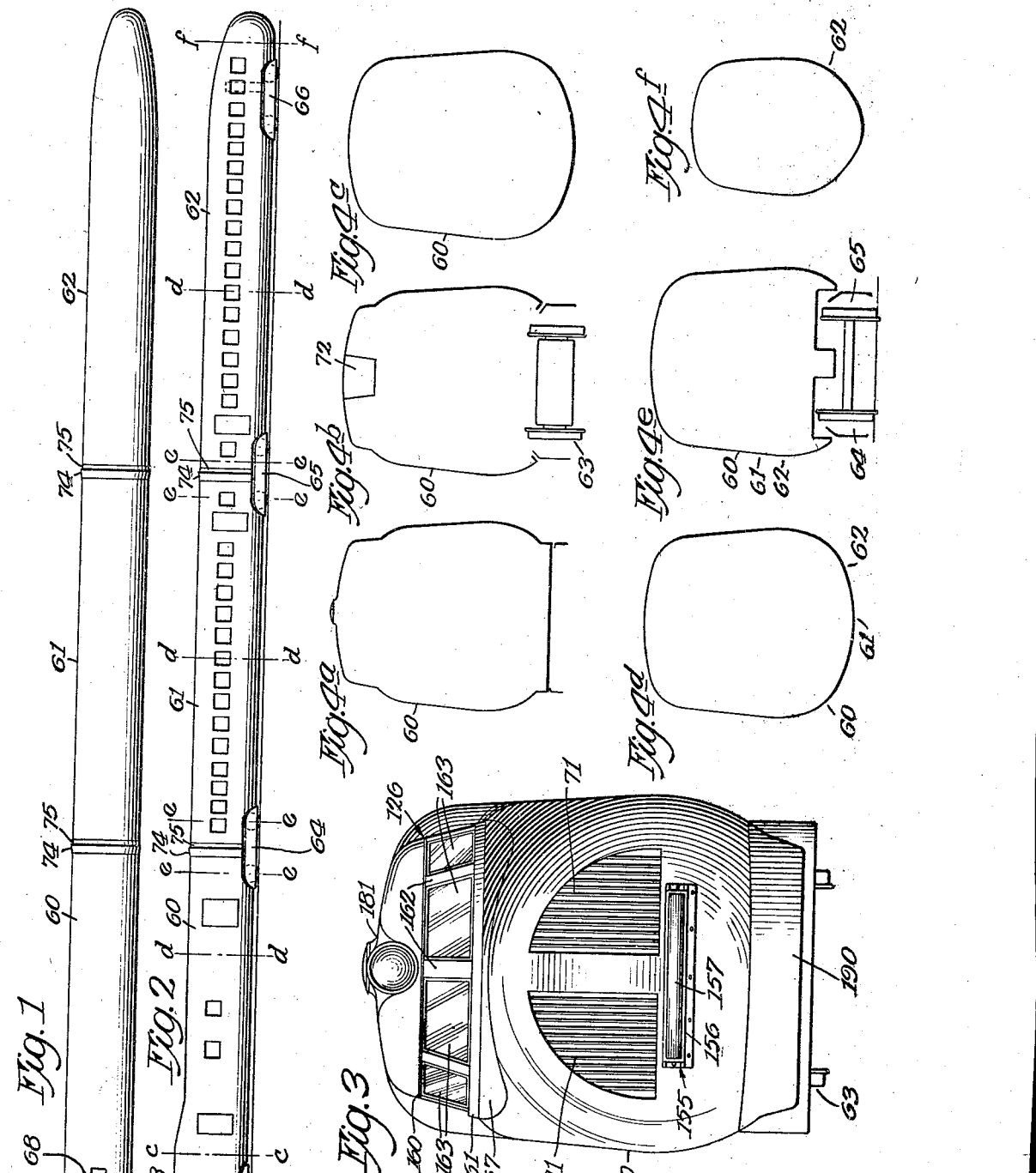
Inventor
Martin P. Blomberg
By Gibson, ... Gttys

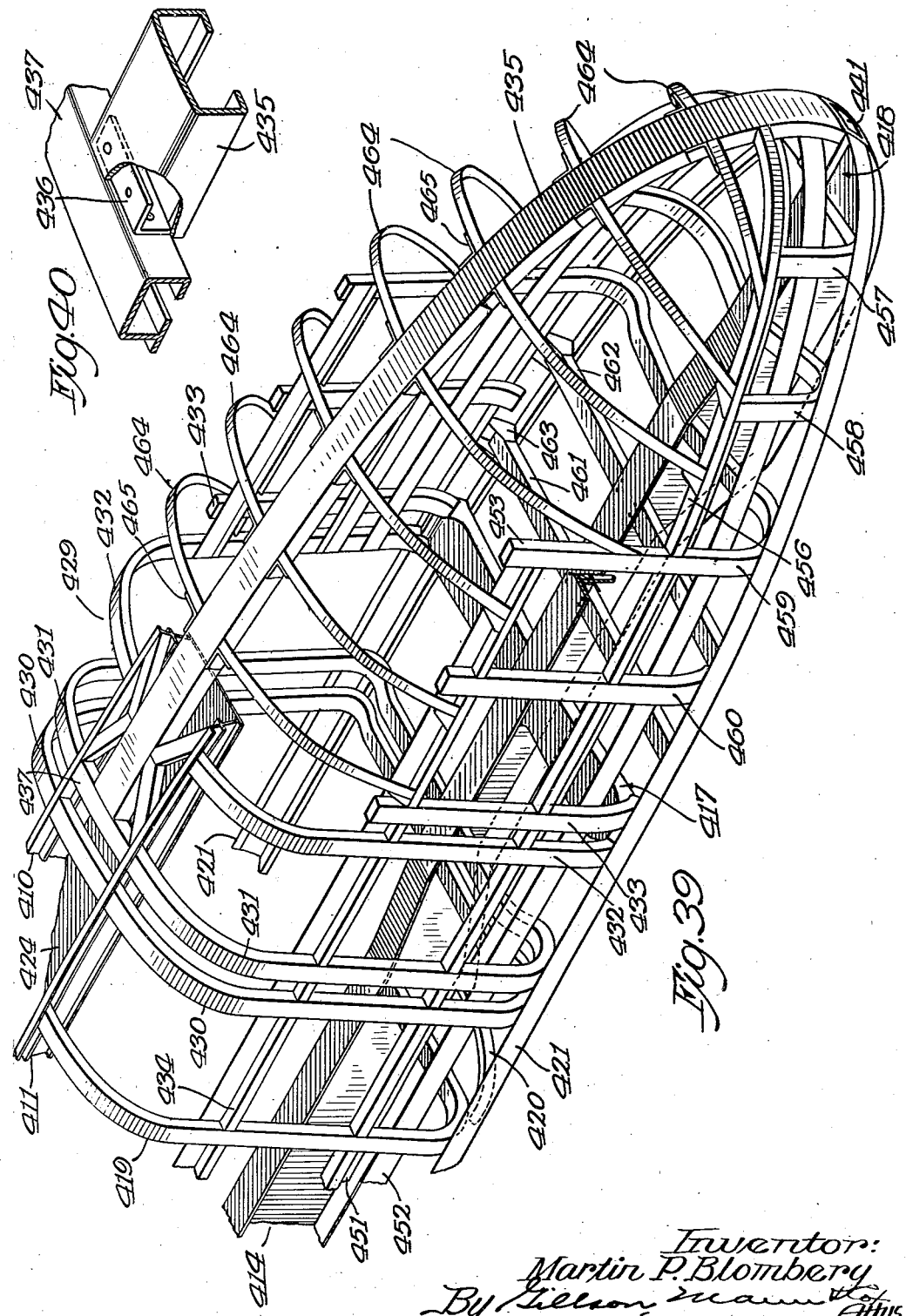

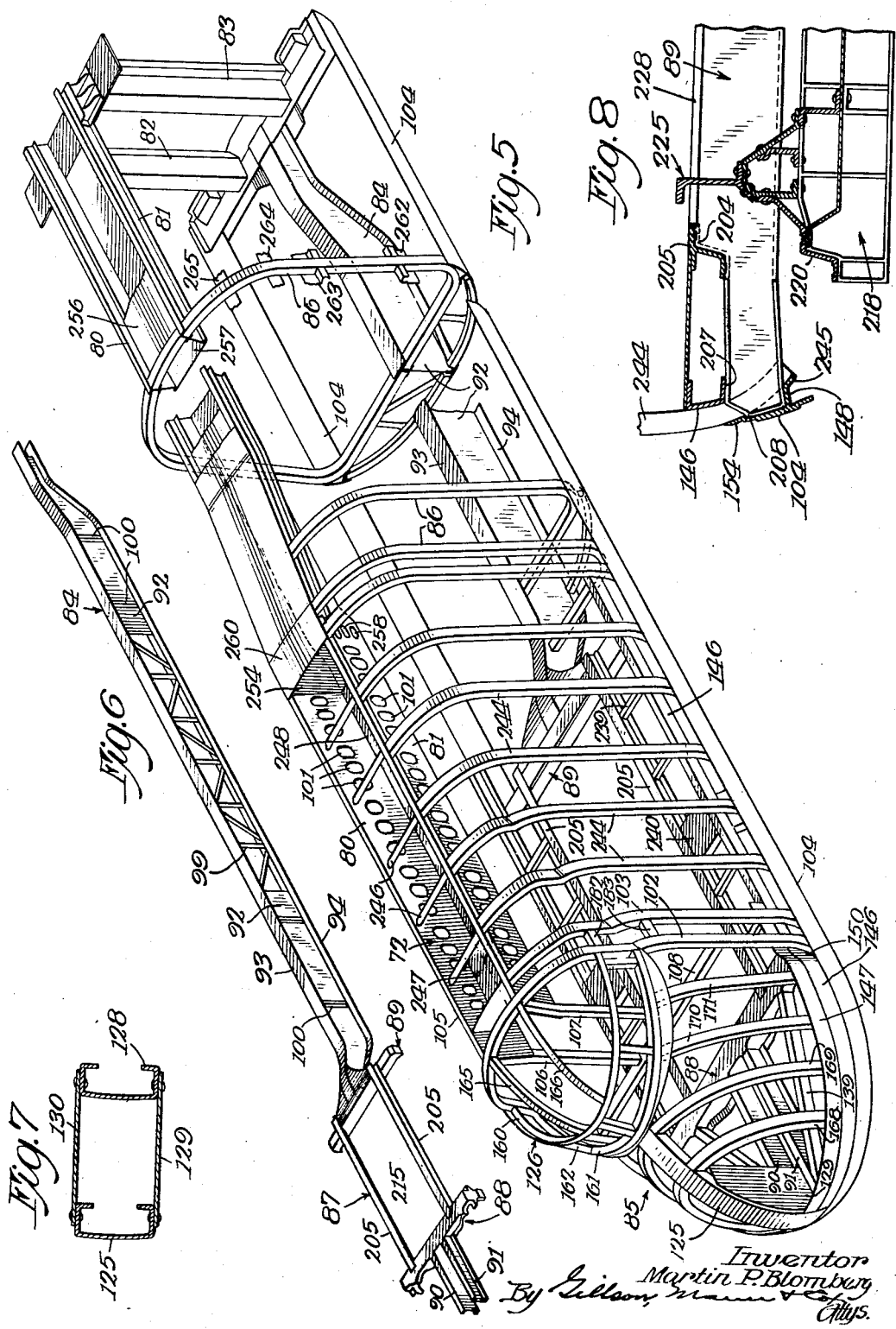

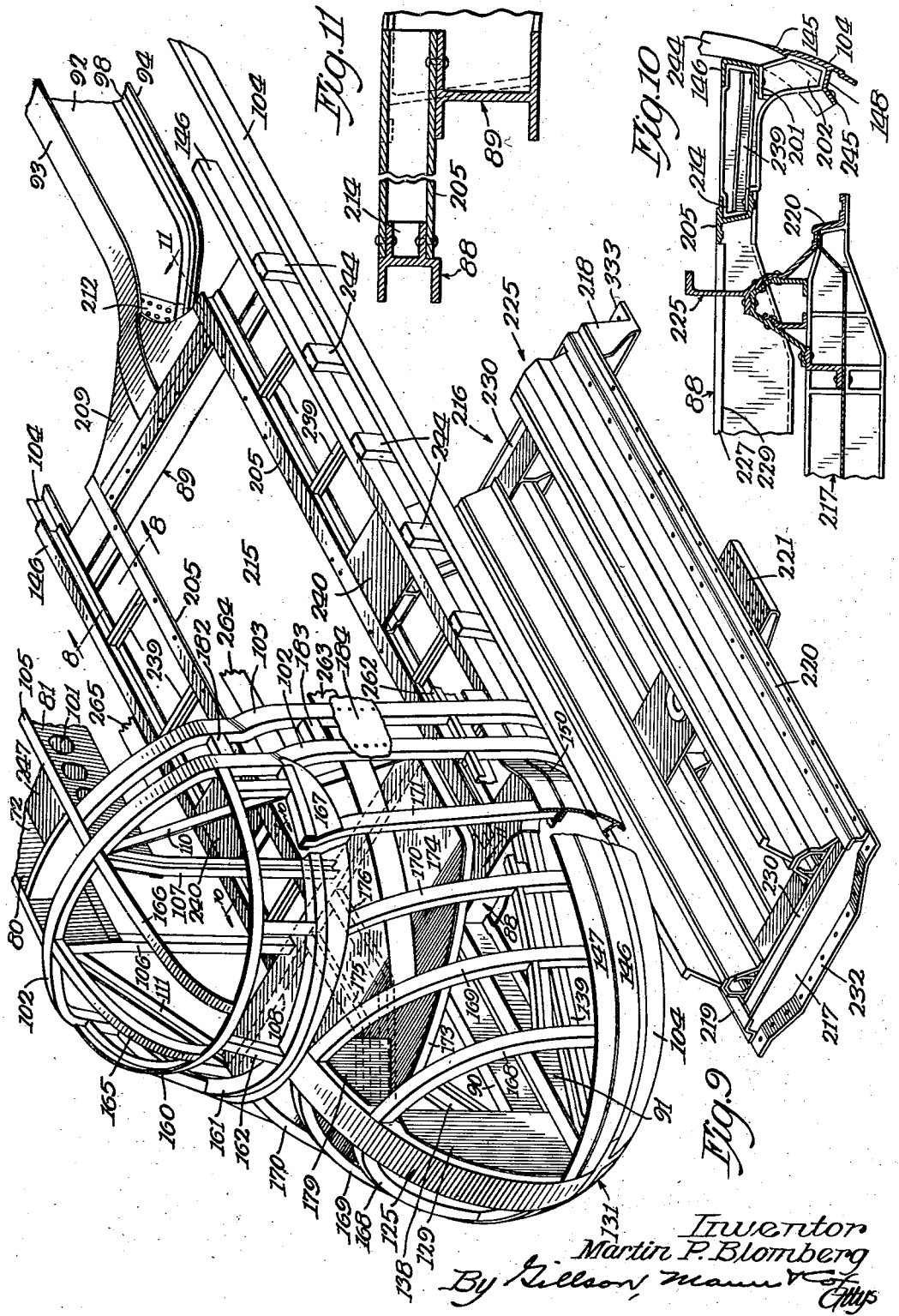

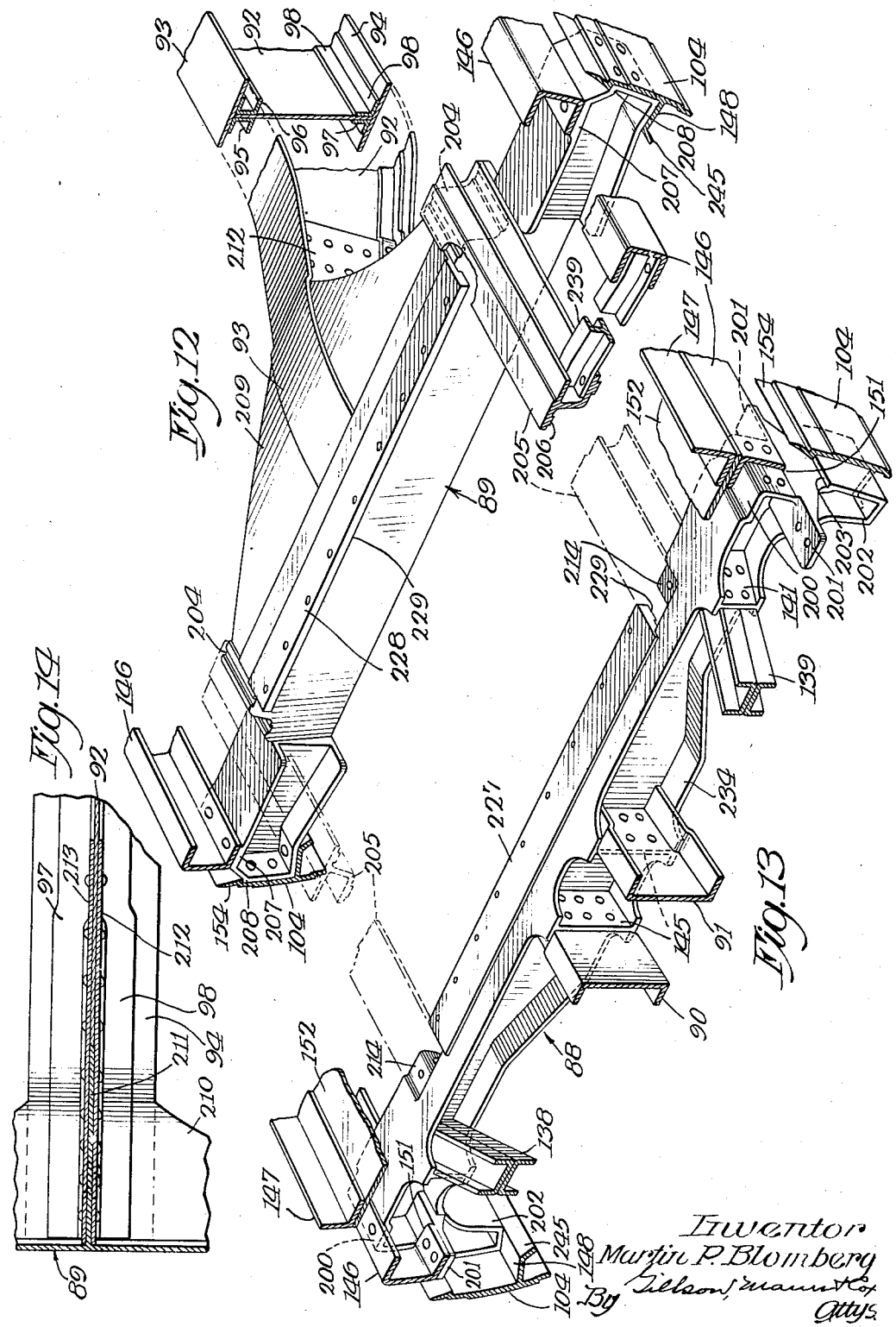

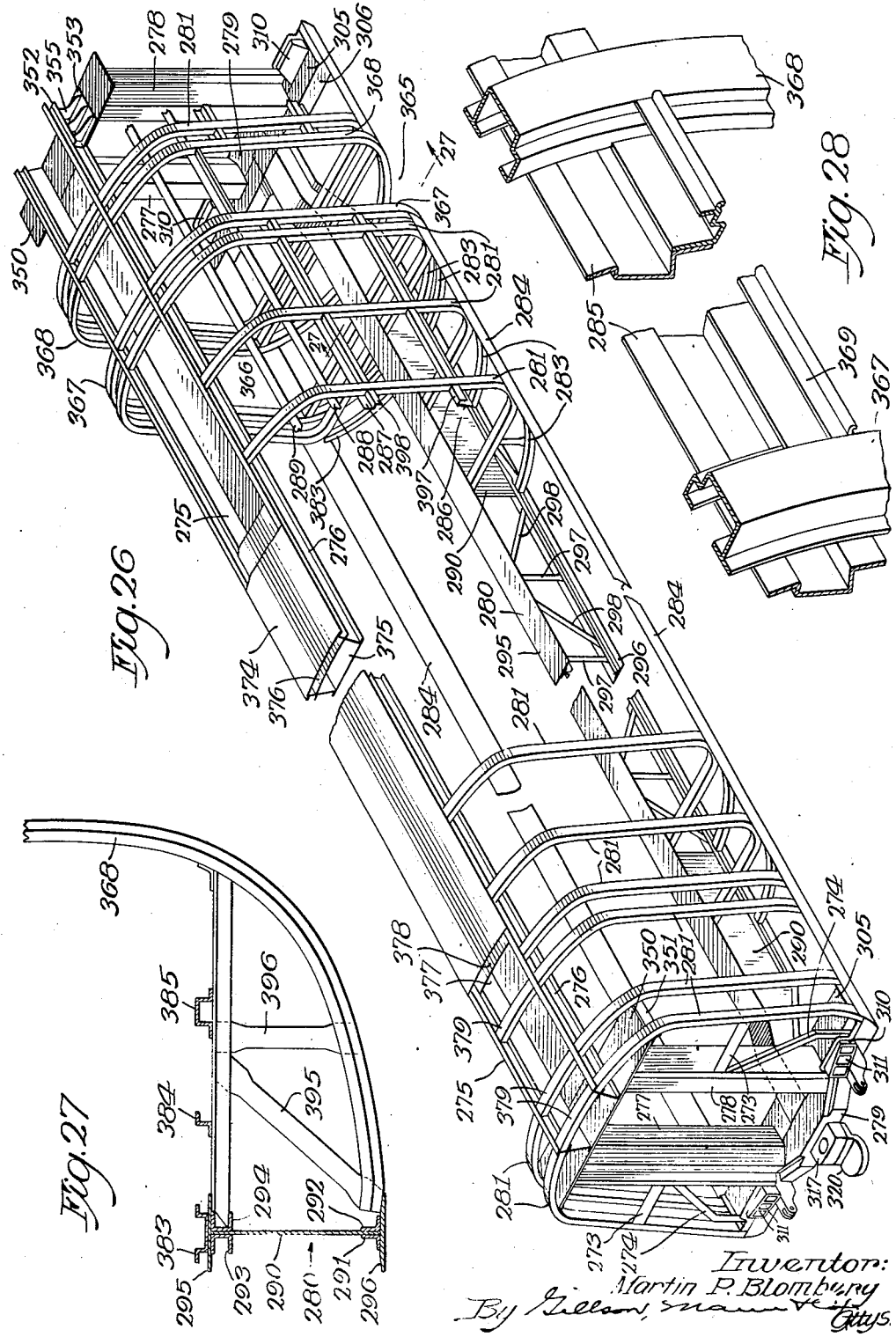

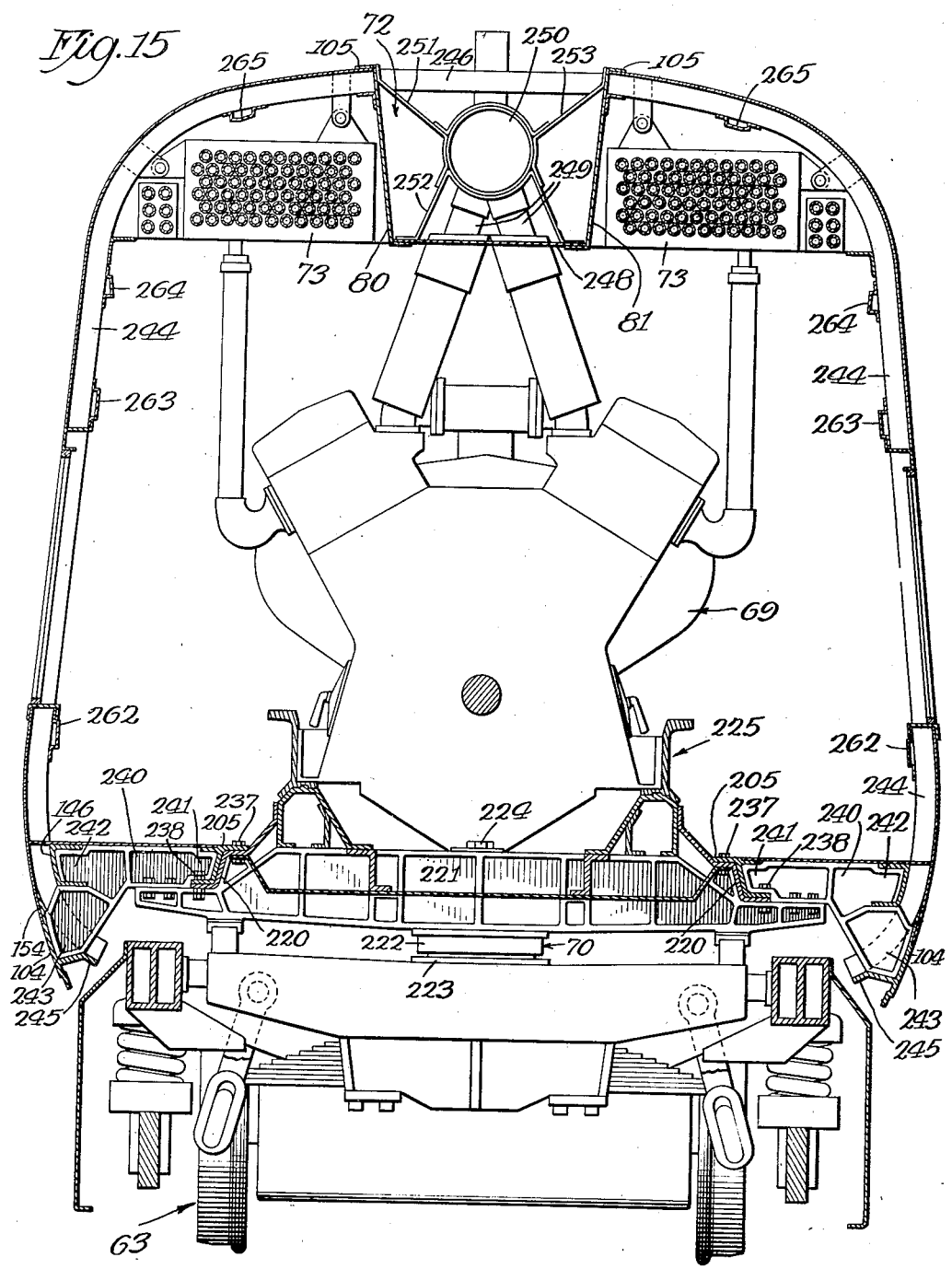

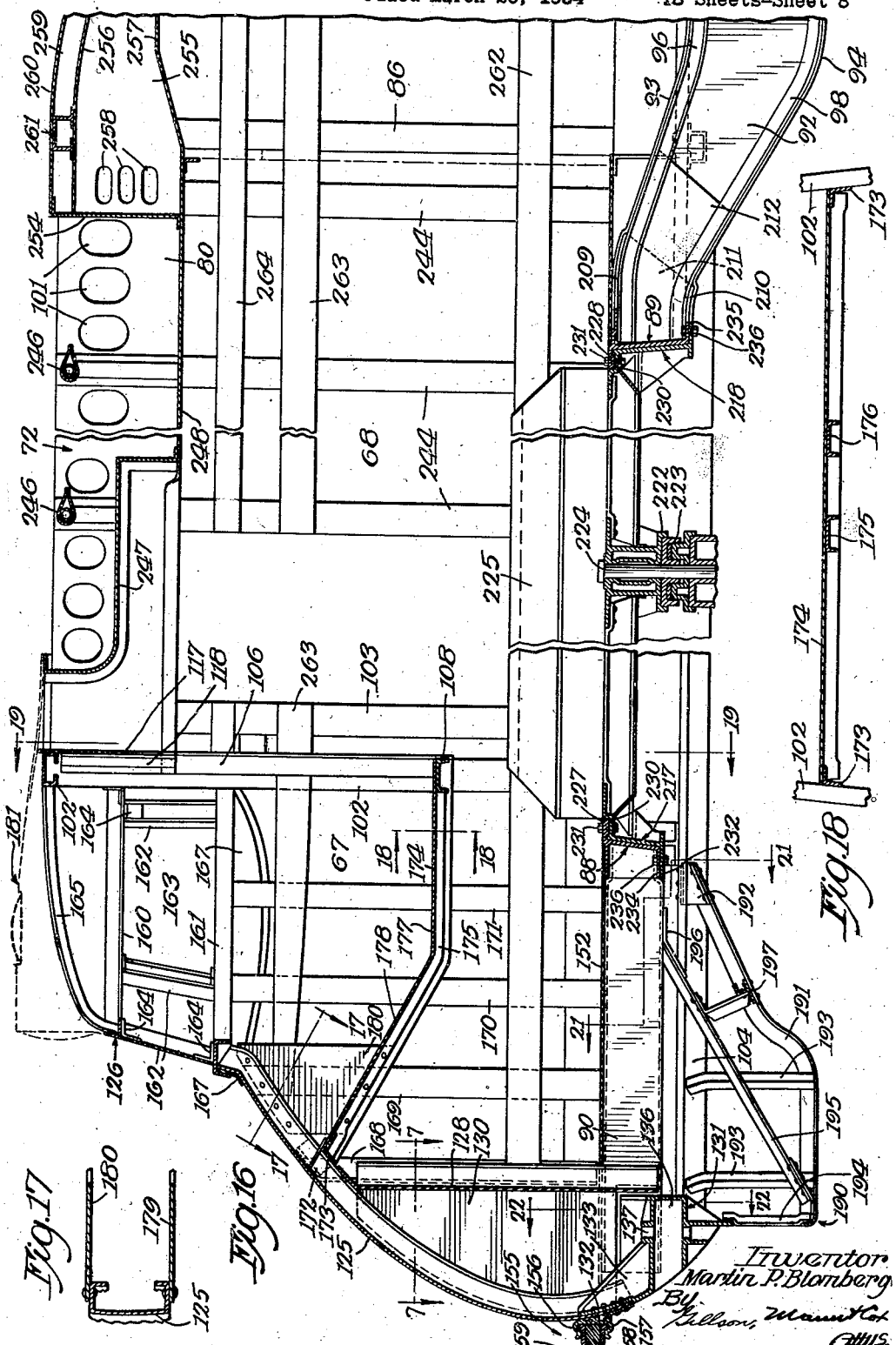

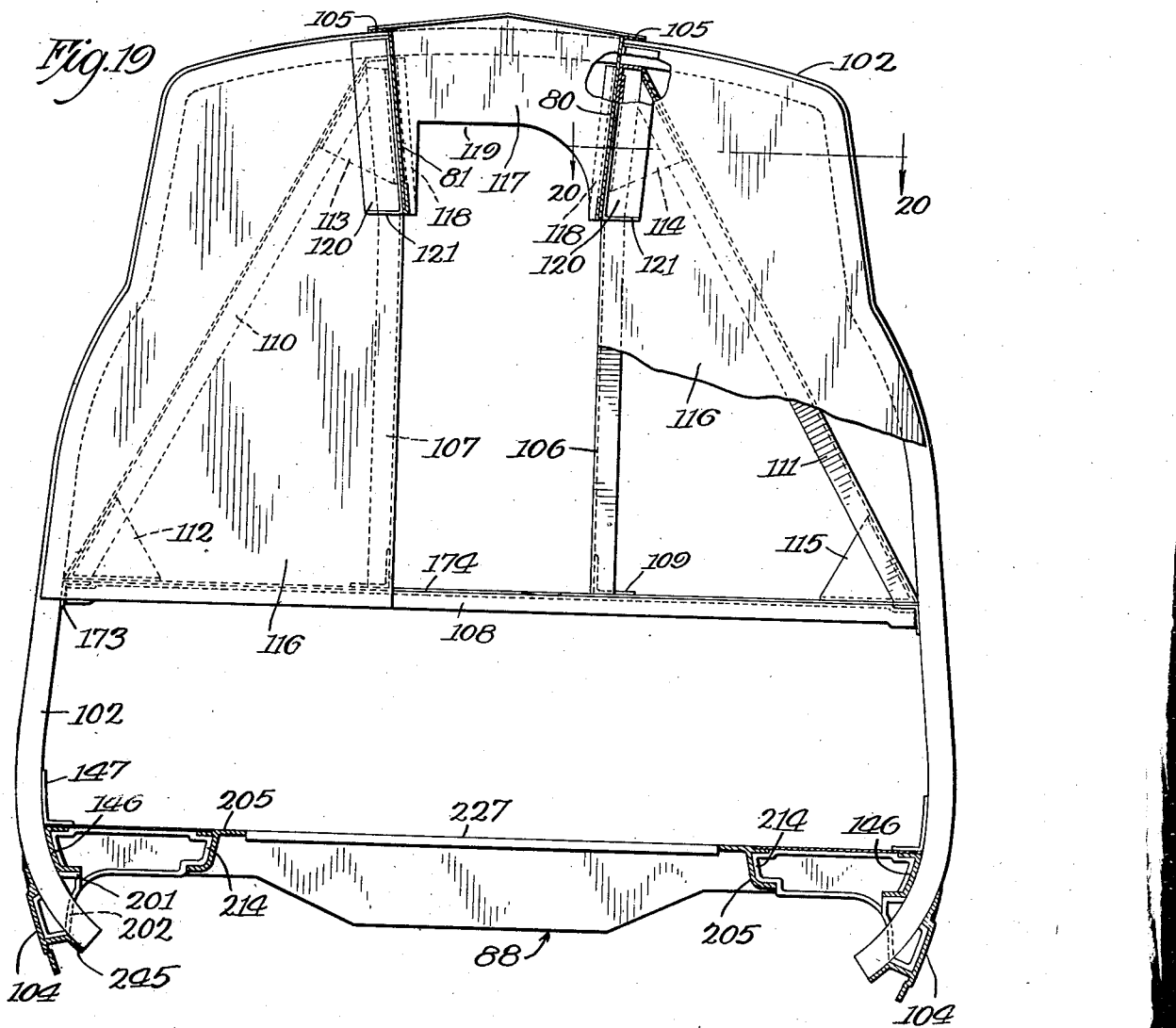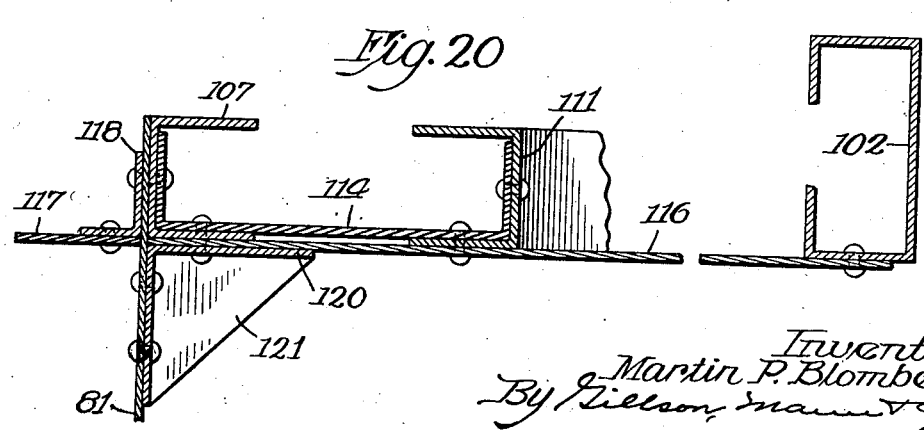

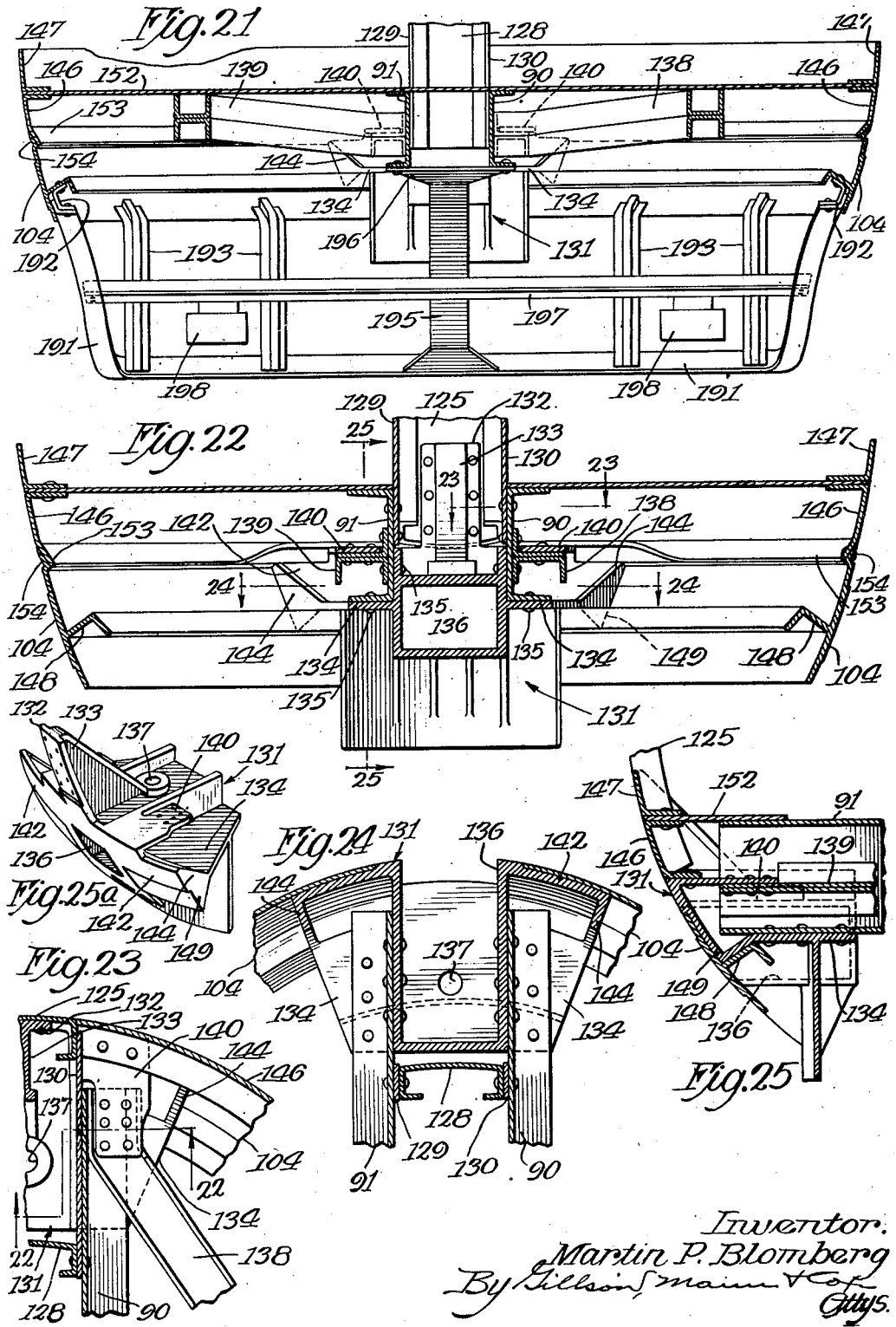

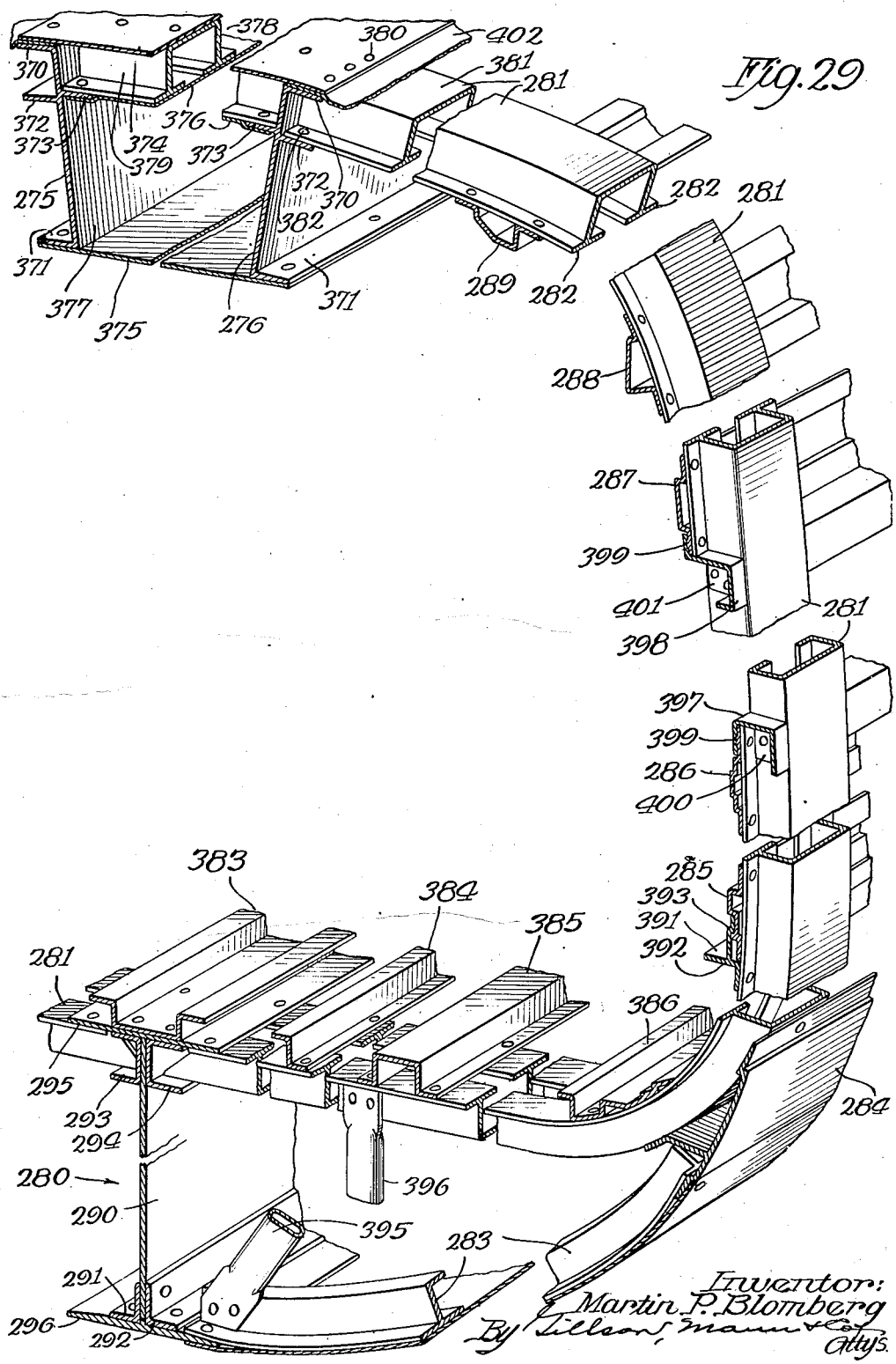

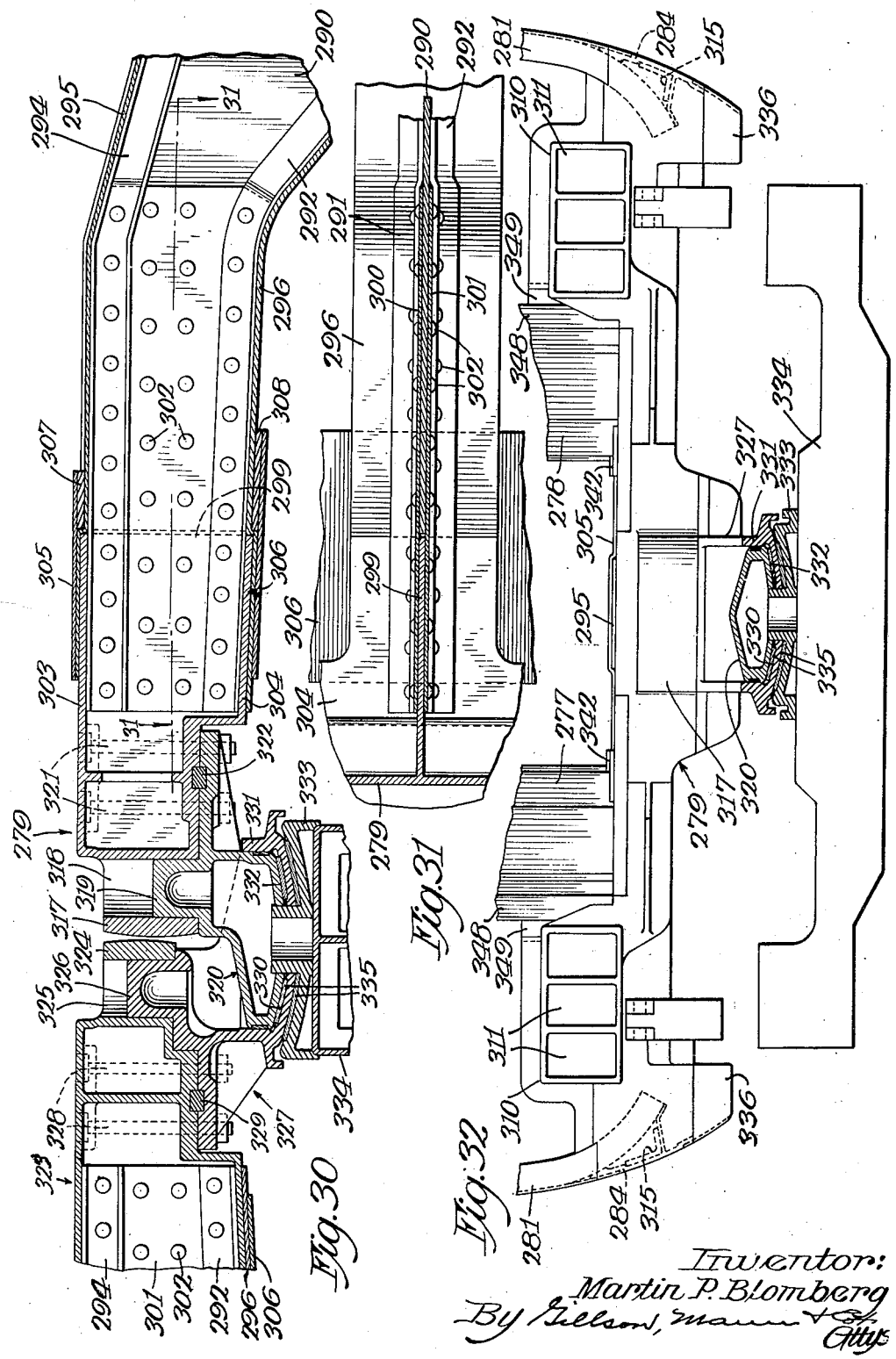

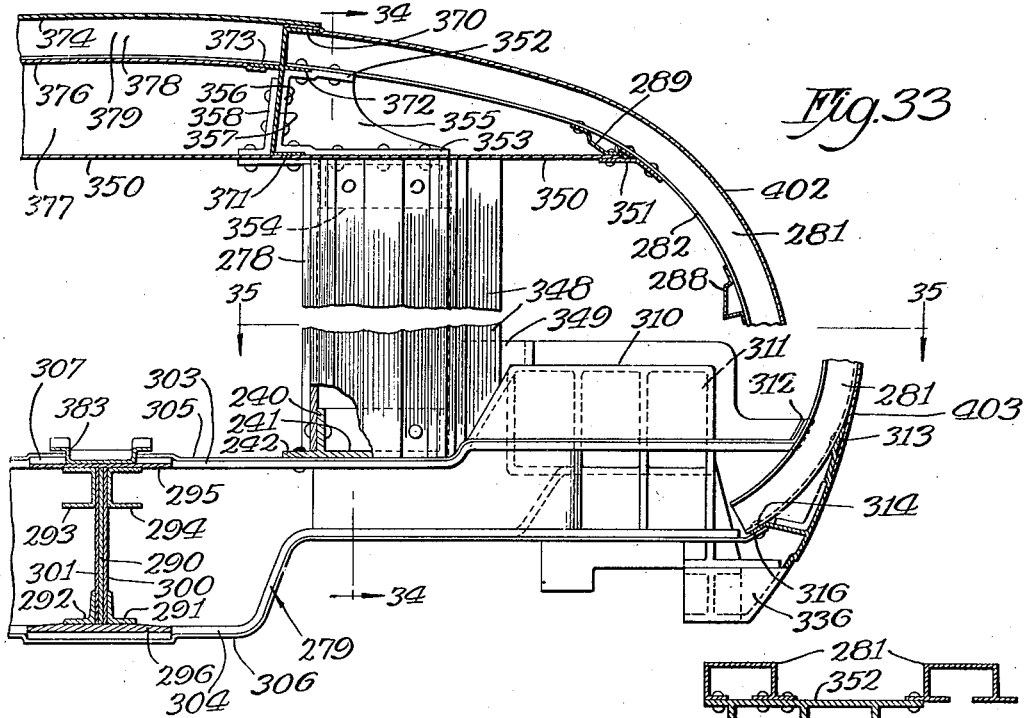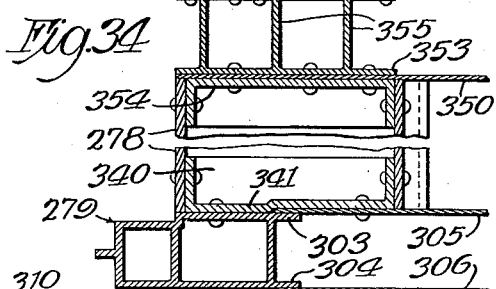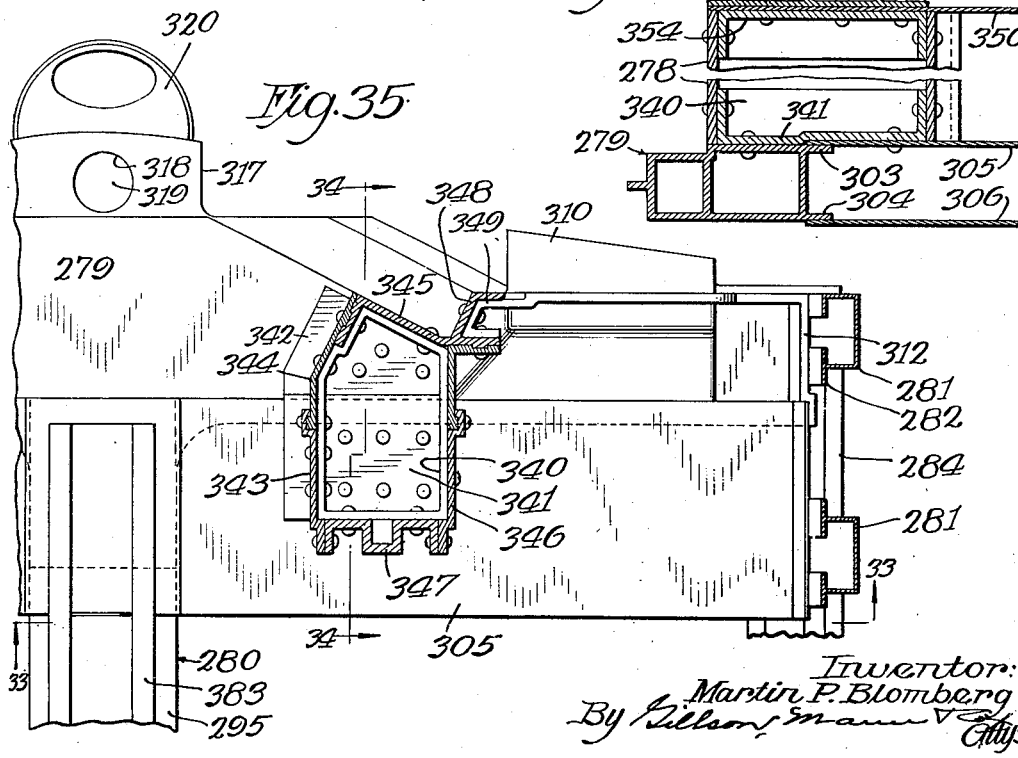

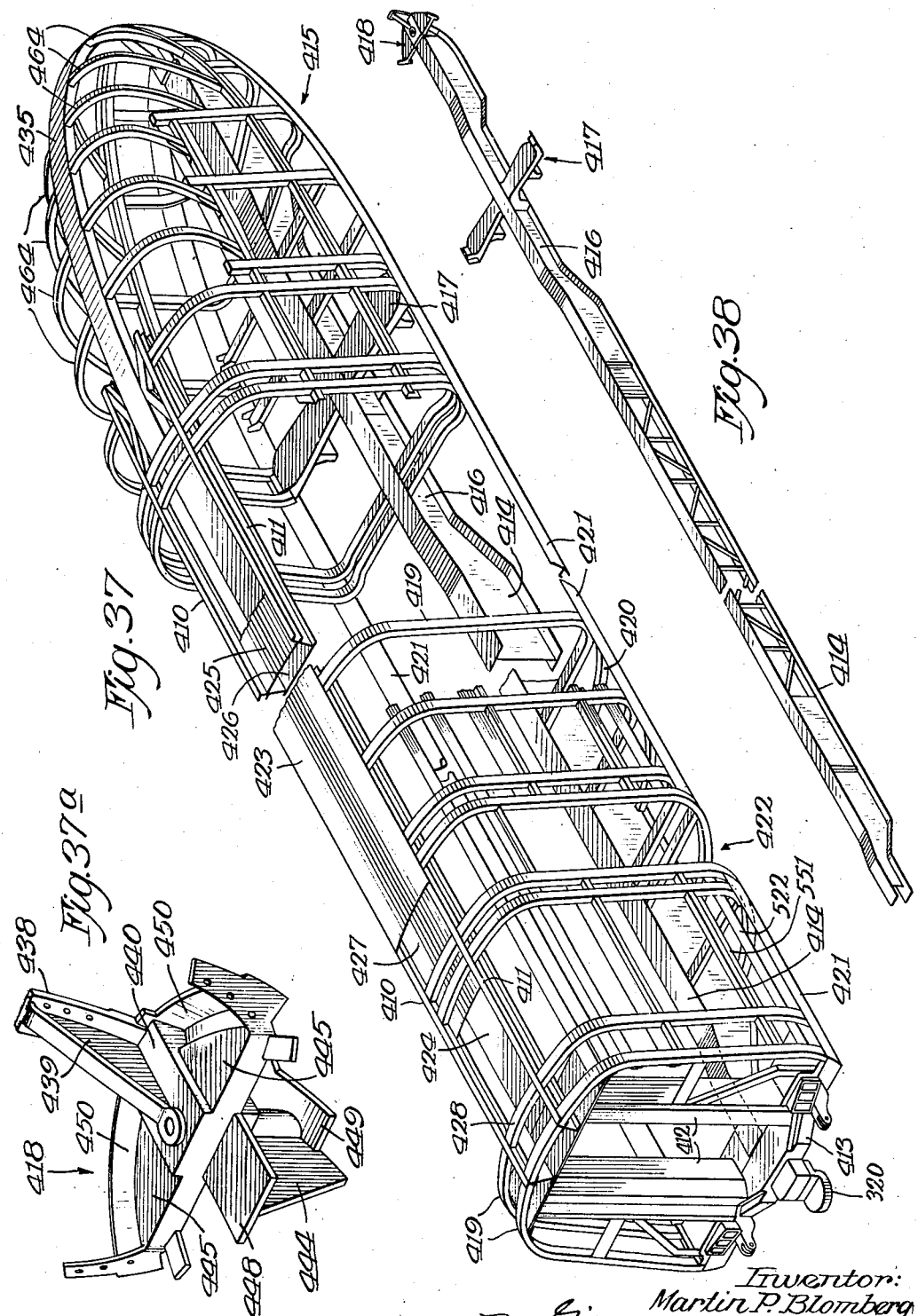

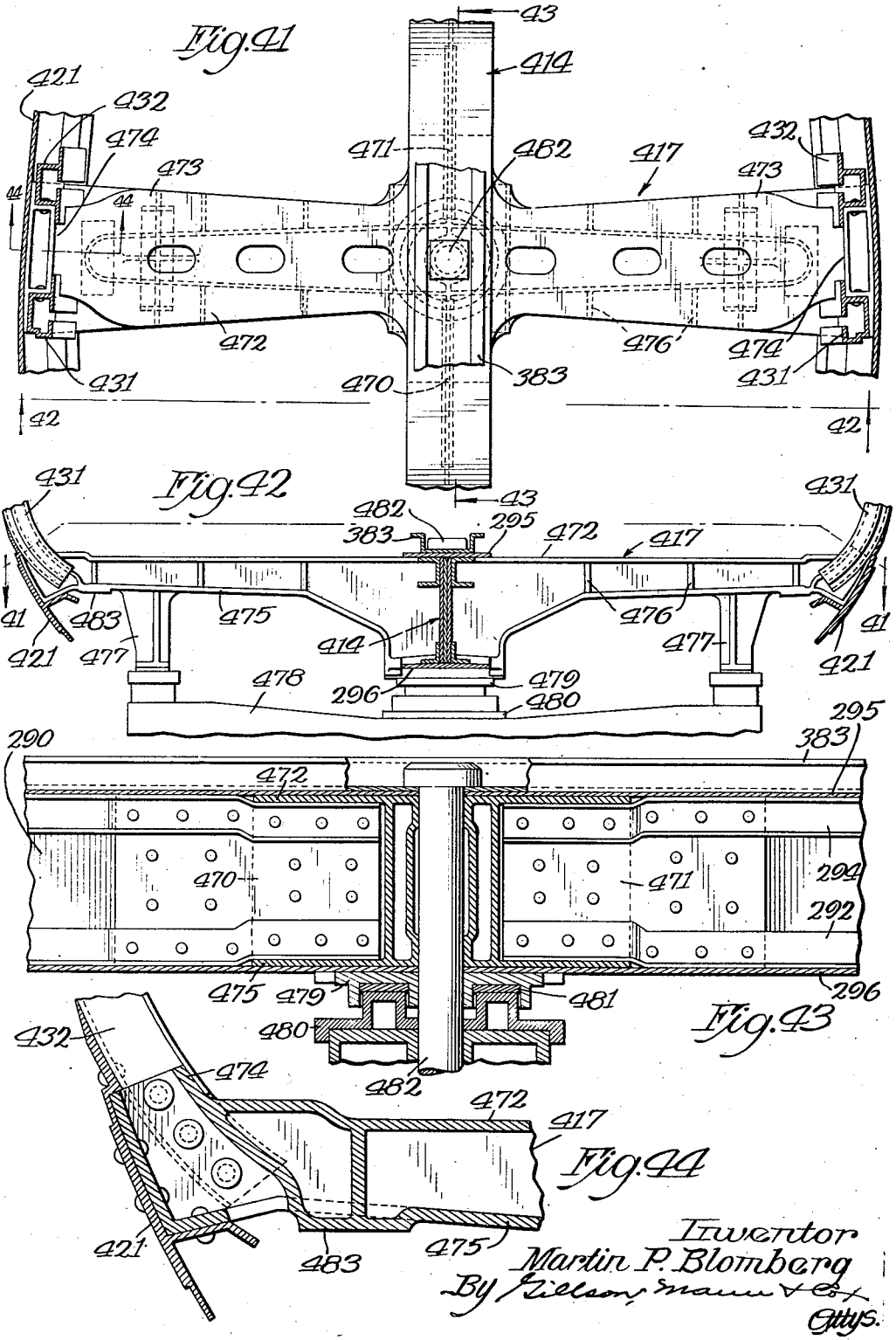

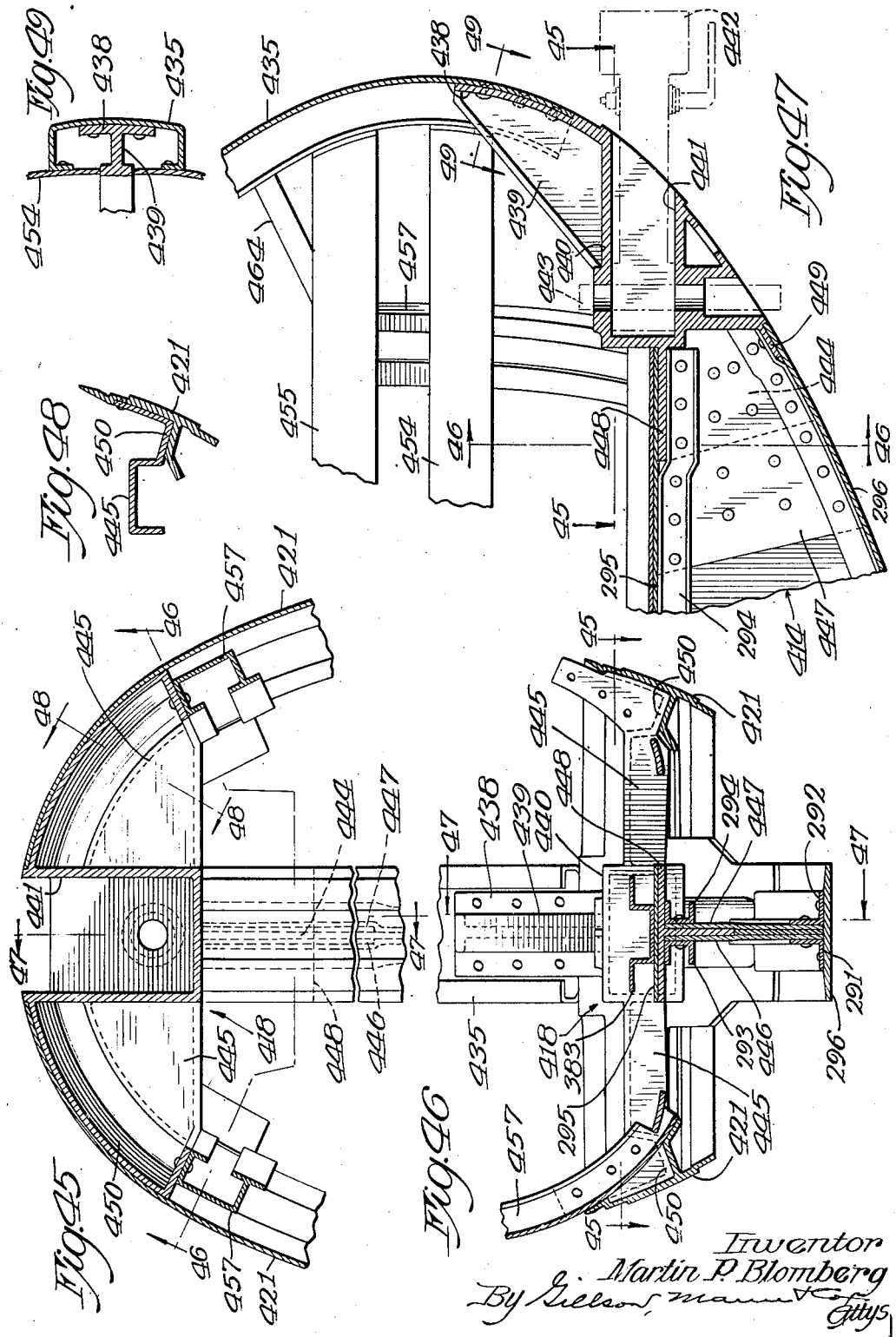

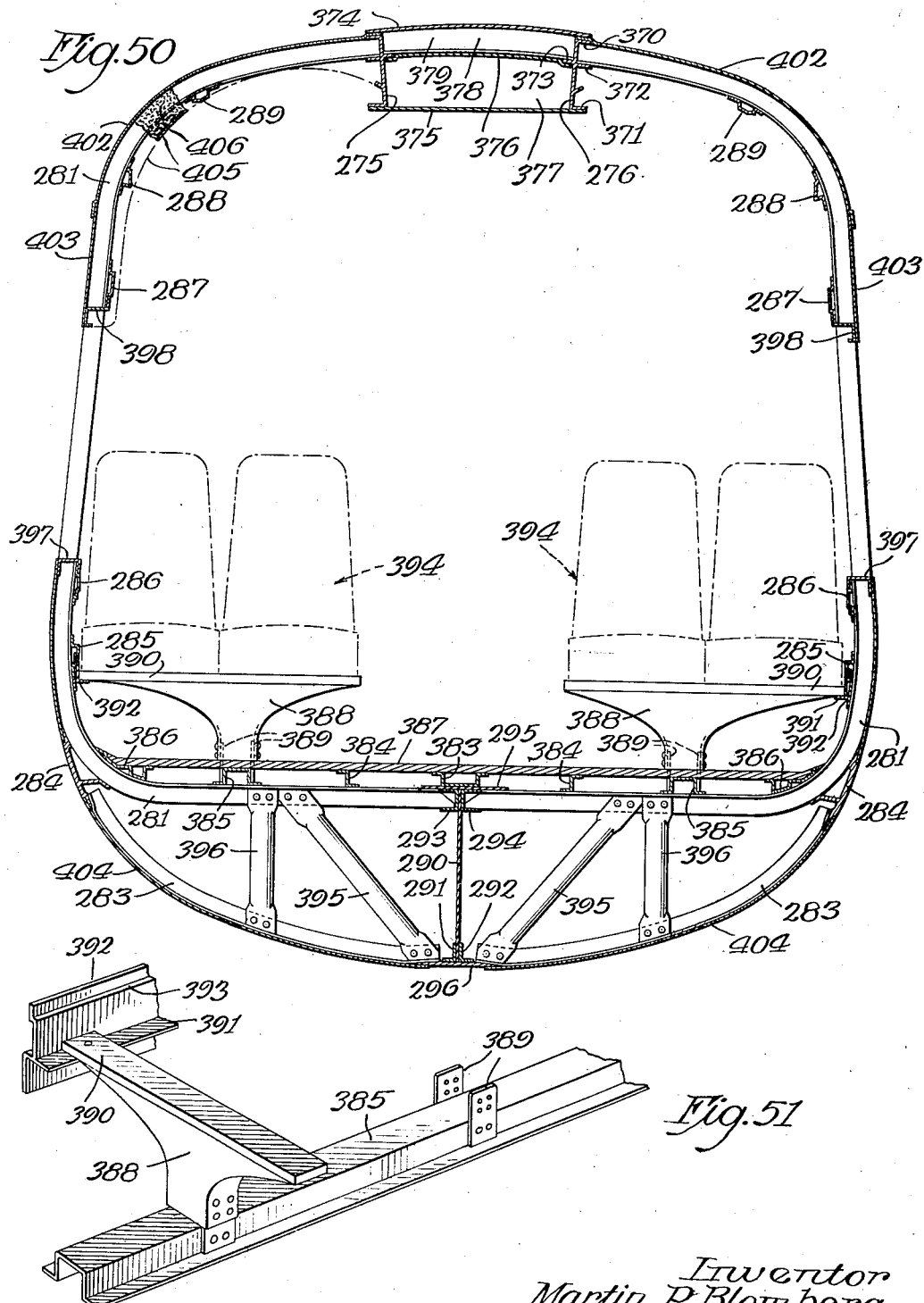

Patented June 24, 1941

2,247,273

UNITED STATES PATENT OFFICE

2,247,273

FRAMING

Martin P. Blomberg, Chicago, Ill., assignor to Pullman-Standard Car Manufacturing Company, Chicago, Ill., a corporation of Delaware Application March 26, 1934, Serial No. 717,420

38 Claims. (Cl. 105—2)

Common practice in railway passenger car construction calls for a heavy underframe, built up side and end frames, and carlines joining the tops of the side frames (see Car Builder's Cyclopedia, published in New York by the Simmons-Boardman Publishing Company, 1931 edition, section 7, page 594 particularly). The underframe is the main load carrying structure, the rest being essentially super-structure.

The present invention departs from conventional car building practice by providing vertical trapezoidal framework along the center line of the car for carrying the major portion of the car load, supplemented by transverse ribs and various longitudinal framing members. The ribs take the place of the usual carlines, side posts, crossbearers, and other floor supporting members, and the longitudinal framing members tie them together.

Among the principal objects of the invention are the following: To reduce weight without sacrificing strength; to adapt the framing to body shapes consistent with correct principles of aerodynamics; to provide the necessary strength for resisting front, side and rear impacts without unduly increasing the total weight of the car; and to hold the cost of construction to a minimum.

Further and other objects and advantages will become apparent as the disclosure proceeds and the description is read in conjunction with the accompanying drawings, in which Fig. 1 is a plan view of an articulated rail car embodying the principles of this invention;

Fig. 2 is a side, elevational view of the car;

Fig. 3 is a front, elevational view of the car;

Figs. 4a to 4f are representative cross sectional views showing the general contour of the car, the sections being taken on the lines a—a, b—b, etc. respectively, of Fig. 2;

Fig. 5 is a perspective view showing the principal framework of the leading or motorized section of the car;

Fig. 6 is a perspective view of the center sill used in the motorized section;

Fig. 7 is a sectional view through the ridge beam in the nose of the car, the section being taken on the line 7—7 of Fig. 16;

Fig. 8 is a fragmentary, sectional view taken on the line 8—8 of Fig. 9 and showing details of the engine bed and engine bed frame;

Fig. 9 is an enlarged perspective view of the nose of the car, the engine bed being shown downwardly displaced from the engine bed frame;

Fig. 10 is a fragmentary, sectional view taken on the line 10—10 of Fig. 9, looking toward the nose of the car;

Fig. 11 is a sectional view taken on the line 11—11 of Fig. 9, showing the connection between one of the engine bed stringers and the cross sills, the intermediate portion of the stringer being broken away;

Fig. 12 is a perspective view of the rear cross sill with its connections;

Fig. 13 is a perspective view of the front cross sill with its connections;

Fig. 14 is a longitudinal, sectional view through the center sill at its point of connection with the rear cross sill;

Fig. 15 is a transverse, sectional view through the engine room in the leading car section, the section being taken just in front of the body bolster and looking rearwardly;

Fig. 16 is a longitudinal, vertical, sectional view of the engine room and car nose, taken along the center line of the car, certain intermediate portions of the engine room being omitted;

Fig. 17 is a detail, sectional view taken on the line 17—17 of Fig. 16;

Fig. 18 is a sectional view through the floor of the control cab, the section being taken on the line 18—18 of Fig. 16;

Fig. 19 is a transverse, sectional view through the motorized section at the line 19—19 of Fig. 16, the engine bed being omitted;

Fig. 20 is a detail, sectional view taken on the line 20—20 of Fig. 19;

Fig. 21 is a detail, sectional view taken on the line 21—21 of Fig. 16;

Fig. 22 is a transverse, sectional view through the rear of the coupler casting, the section being taken on the line 22—22 of Figs. 16 and 23;

Fig. 23 is a fragmentary, sectional view taken on the line 23—23 of Fig. 22;

Fig. 24 is a sectional view taken on the line 24—24 of Fig. 22;

Fig. 25 is a sectional view taken on the line 25—25 of Fig. 22 showing particularly the connection between one of the buff sills and the coupler casting;

Fig. 25a is a perspective view of the coupler casting;

Fig. 26 is a perspective view showing the general framing of the intermediate car section;

Fig. 27 is a fragmentary, sectional view taken transversely through the car at the door opening, as indicated at 27—27 in Fig. 26;

Fig. 28 is a perspective view showing the door header and its interconnection with the ribs;

Fig. 29 is a perspective view illustrating a typical cross section through the car;

Fig. 30 is a vertical, sectional view through one of the articulated joints between car sections, the view showing in addition to the articulated joint the manner in which the center sill is joined with the end sill;

Fig. 31 is a horizontal, sectional view taken on the line 31—31 of Fig. 30;

Fig. 32 is an end, elevational view of the lower portion of one of the car section ends, the articulated joint being shown in section;

Fig. 33 is a vertical, sectional view looking toward the end assembly, the section being taken on the line 33—33 of Fig. 35;

Fig. 34 is a compressed, vertical section through one of the end posts, the section being taken on the lines 34—34 of Figs. 33 and 35;

Fig. 35 is a sectional view looking down upon the end sill assembly, the section being taken on the line 35—35 of Fig. 33;

Fig. 37 is a perspective view showing the general framing of the trailer section;

Fig. 37a is a perspective view of the rear coupler casting;

Fig. 38 is a perspective view of the center sill and body bolster used in the trailer section;

Fig. 39 is an enlarged perspective view of the tail of the car;

Fig. 40 is a detail, perspective view showing the connection between the spinal sill and one of the transverse ribs;

Fig. 41 is a sectional view taken on the line 41—41 of Fig. 42 looking down on the body bolster of the trailer section;

Fig. 42 is a sectional view taken on the line 42—42 of Fig. 41, showing the body bolster in elevation;

Fig. 43 is a longitudinal, sectional view taken along the center sill as indicated at 43—43 of Fig. 41;

Fig. 44 is an enlarged detail view showing the manner of connecting the end of the body bolster with the side sill and ribs, the section being taken on the line 44—44 of Fig. 41;

Fig. 45 is a horizontal, sectional view through the tail coupler casting, the section being taken on the lines 45—45 of Figs. 46 and 47;

Fig. 46 is a vertical, sectional view through the tail of the car looking in the direction of the coupler casting, the section being taken on the lines 46—46 in Figs. 45 and 47;

Fig. 47 is a longitudinal, vertical section taken on the lines 47—47 of Figs. 45 and 46.

Fig. 48 is a detail view taken on the line 48—48 of Fig. 45;

Fig. 49 is another detail view taken on the line 49—49 of Fig. 47;

Fig. 50 is a typical cross sectional view showing the manner in which the seat pedestals are secured to and made a part of the car framing; and Fig. 51 is a perspective view showing the mounting of the seat pedestal in more detail.

Figure 36:
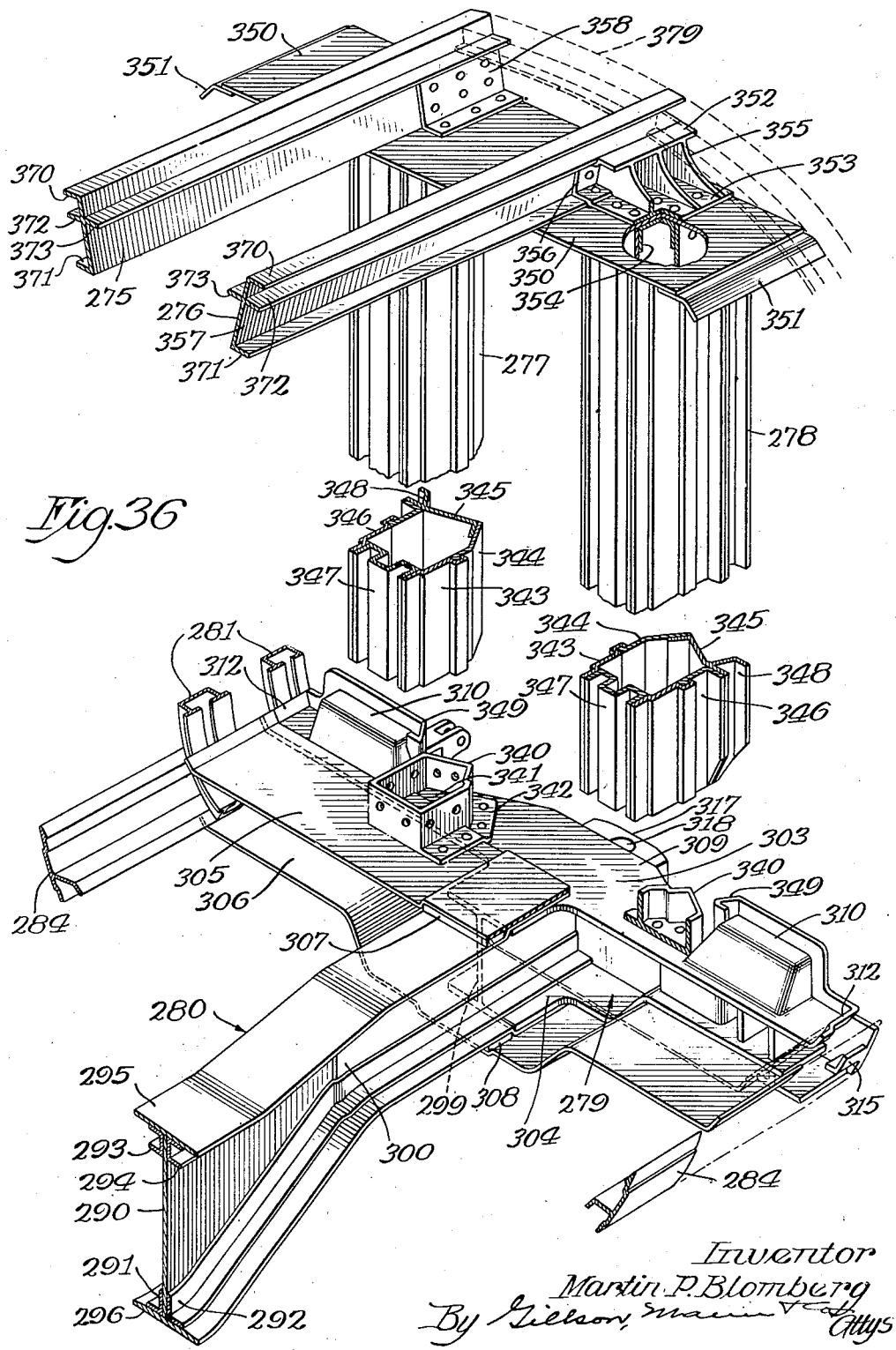
Fig. 36 is an exploded, perspective view of the end assembly.

For the purpose of disclosure, the invention has been shown applied to a triple section articulated rail car, but many features of the invention are useful in other relations, and the scope of the invention is to be measured by the appended claims construed as broadly as the prior art will permit.

The car is composed of three sections, a leading or motorized section 60, an intermediate section 61, and a trailer section 62, and is supported by a motor truck 63, articulated trucks 64 and 65, and a trailer truck 66. The front portion of the motorized section 60 includes a control cab 67 and an engine room 68, the rest of the section being used for mail and baggage. The intermediate and trailer sections 61 and 62 are passenger carrying sections, and at the rear of the trailer section buffet equipment is provided.

The car has a Diesel electric drive and requires approximately 600 H. P. to propel the car weighing a total of less than 200,000 lbs. at speeds of 90 miles and more.

The Diesel engine, which is shown in outline in Fig. 15 and generally designated 69, is mounted directly on the motor truck 63 above the center bearing 70 so that it maintains a fixed position within the car. It is cooled by air drawn through nostrils 71 in the nose of the car, this air passing over the engine and being expelled from the car through a well or trough 72 in the car roof. Cooling radiators 73 (Fig. 15) are provided adjacent to the roof of the car on opposite sides of the well in the path of the circulating air.

The car is shaped to reduce air resistance to a minimum and to this end, the nose is rounded but rather blunt and the tail tapers off toward the rear. The general cross sectional shape of the car is ovate rotundate, as best shown in Figs. 4a to 4f, inclusive. It has been found that this shape offers the least resistance to side winds and the rounded belly is effective in preventing air pressure from being built up beneath the car which would offer substantial resistance to the car movement and lessen the car's stability on the track. The trucks are preferably equipped with skirts to further lessen wind resistance.

At the articulated joints between the car sections, metal shields 74 extend rearwardly from the preceding section and telescope over flexible rubber canopies 75 which are yieldingly extended to the fore to enclose the space between the car sections.

*Framing in general*

The framing in each of the car sections is characterized by the fact that the principal framework lies in a vertical plane through the center line of the car. This framework includes a top sill (a term used to designate the sides of the overhead box girder as well as the box girder itself), a center sill, and one or more end posts for joining the top and center sills together at one end. At the other end, the framework consists of either a nose structure, as in the leading car section 60, other end posts, as in the intermediate car section 61, or a tail structure, as in the trailer section 62. In each case, this vertical framework is designed to carry the major portion of the car load, and for convenience of description and in the claims will be called trapezoidal framework.

Supplementing the trapezoidal framework are ribs which extend in vertical planes between the top sill and the center sill, and various longitudinal framing members tie the ribs together in proper spaced relation.

The supplemental framework may be considered as supplying the necessary factor of safety to the trapezoidal framework, this latter framework being preferably calculated so as to have the necessary strength and rigidity to carry, by itself, the entire normal load of the car.

The nose and tail structures are capable of resisting heavy impacts, and in addition are shaped to reduce wind resistance to a minimum and present a pleasing appearance.

For the most part, the framework is made of aluminum alloy in various extruded shapes, although steel castings and steel plates are used at some of the heavily stressed points. The extruded aluminum structural elements are formed with flanged reinforcements, where additional strength is required, and all present broad areas for riveting.

MOTOR SECTION FRAMING

A. In general

The trapezoidal framework in the motorized section 60 comprises a pair of top sills 80 and 81, door end posts 82 and 83, a deep center sill 84 and nose framework, generally designated 85. A plurality of vertical ribs 86 join the top sills with the upper portion of the center sill and serve as combined carlines, side posts and floor supporting members. These ribs are spaced apart at more or less regular intervals, although in Fig. 5 and elsewhere in the drawings, many of the ribs are omitted for the purpose of clarifying the rest of the structure.

The center sill 84 is shown in its entirety in Fig. 6, and for convenience of description will be considered as including the rectangular frame 87 (of which front and rear cross sills 88 and 89, respectively, are a part), and buff sills 90 and 91. The main portion of the center sill comprises a web plate 92, a top cover plate 93, a bottom cover plate 94, top channels 95 and 96, and bottom angles 97 and 98 (see Figs. 6, 12 and 14).

In the central portion of the center sill, where the sill is straight and has uniform depth (as distinguished from the ends where the sill veers upwardly and becomes shallower), the web plate 92 is eliminated and struts 99 are substituted. Stiffeners 100 are provided where the web 92 is used, to furnish additional strength.

B. Nose structure exclusive of engine room framing

The top sills 80 and 81 extend to the front and become deeper (Fig. 5) where they form the sides of the trough 72. Here they are perforated as indicated at 101 to permit the air that is drawn in through the nose to escape to the atmosphere. At the forward end of the top sills are two closely spaced ribs 102 and 103, the former making a complete arch and terminating at the side sills 104, and the latter being formed in two parts, both of which are rigidly secured to the outer faces of the top sills adjacent their upper outwardly extending flanges 105 (Fig. 19) and terminating also at the side sills 104. A pair of channel posts 106 and 107 extend downwardly from the top sills 80 and 81 and rest upon a cross channel 108 (Figs. 16 and 19), the posts and channel being reinforced by angle brackets 109. Diagonal braces 110 and 111 join the top sills with the outer ends of the cross channel 108 and the entire structure is strengthened by gusset plates 112, 113, 114, and 115, as best shown in Figs. 19 and 20.

Plates 116 extending from the rib 102 to the posts 106 and 107 form a partition between the engine room 68 and the control cab 67 (Figs. 16, 19 and 20). A similar plate 117 extends between the top sills 80 and 81 to complete the partition and is held in place by angles 118. The cut-out portion 119 accommodates a door, not shown. A further reinforcement of the structure in the vicinity of the top sills in the partition is provided by angles 120 having horizontal gussets 121, the angles being secured to the plates 116 and the top sills as shown in Fig. 20.

The main framing member in the nose structure is a ridge beam 125 of channel shape extending from the cab structure, generally designated 126, to the coupler casting 131 (Fig. 16). The beam is substantially semi-parabolic in side elevation and is reinforced by another channel 128 that is joined with the ridge beam 125 by plates 129 and 130 (Fig. 7). The two channel bars 125 and 128 connected as they are with plates 129 and 130 form a heavy box girder that is capable of withstanding extremely heavy shocks.

The coupler casting 131 has an upwardly extending forward portion 132, reinforced by a heavy gusset 133 (Figs. 16 and 23) adapted to receive the lower end of the ridge beam and be securely united therewith (see Fig. 16). On opposite sides of the coupler casting are ledges 134 upon which the ends of the buff sills 90 and 91 rest, and rivets 135 secure the bottom flanges of the buff sills and the webs to the coupler casting (Fig. 22). The plates 129 and 130 which connect the ridge beam with the channel 128 are riveted to the inner faces of the buff sills 90 and 91 (Fig. 22). Thus, the ridge beam is securely anchored to the buff sills through the coupler casting.

The coupler casting is provided with an opening 136 to receive the coupler bar, and a vertical aperture 137 is provided to receive the coupler pin.

Diagonal braces 138 and 139 consisting of opposed channel bars extend rearwardly from the coupler casting (Fig. 23) and join with the front cross sill 88. The braces are secured at their forward ends to horizontal webs 140 integral with the coupler casting (see Figs. 22, 23 and 25) and at their rearward ends, they are joined with a vertical web 141 on the front cross sill 88.

The channel 128 which reinforces the ridge beam 125 terminates at its lower end between the buff sills 90 and 91, as shown in Fig. 24, and is riveted to the buff sills.

The coupler casting 131 also has laterally extending wings 142 reinforced by the horizontal webs 134 and by inclined webs 144.

The rear end of the buff sills 90 and 91 are rigidly secured to vertical webs 145 on the front cross sill 88, as best shown in Fig. 13.

Various longitudinal framing members originate at the coupler casting and extend rearwardly in horizontal planes to build up a strong side structure where impacts are likely to occur. These framing members in general are semiparabolic in plan, and include the side sills 104 which extend the full length of the car section, a channel 146 terminating in rear of the cross sill 89 (see Fig. 5), and an angle 147 terminating slightly in rear of the front cross sill 88. The side sills 104 having inwardly extending flanges 148 that fit snugly against the lower front portion 149 of the coupler casting (see Fig. 25). The casting is recessed, as shown in Figs. 24 and 25, so that the side sill is flush with the front face of the casting.

The channels 146 rest upon the horizontal webs 140 and are bent inwardly, as indicated at 150 (Fig. 5), to come within the ribs 102 and 103. At the cross sill, the lower flanges of the channels are cut-away as indicated at 151, to accommodate the end of the cross sill casting, as shown best in Fig. 13. At the rear cross sill casting 89, the channel 146 merely rests upon the upper face of the casting and is riveted in place, as shown in Fig. 12.

Between the coupler casting and the point where the channel 146 turns inwardly to pass on the inside of ribs 102 and 103, the bottom flange of the channel is bent downwardly, as indicated at 153, Fig. 22, to rest against the offset portion 154 of the side sill.

Between the channel 146 and the angle 147 is a plate 152 which serves as a floor sheathing in addition to being a reinforcement (Fig. 25). The angle 147 rests upon the plate 152 and follows the channel 146 rearwardly within the ribs 102 and 103 where it terminates, as shown in Fig. 5 (see also Fig. 13).

The cab structure 126 comprises an upper angle 160 and a lower channel 161 rigidly secured at their ends to the vertical rib 102 (see Figs. 5 and 9). The space between the angle and channel is divided into a plurality of windows 163 by spacers 162 secured in place by angle brackets 164. Carlines 165 and 166 connect the upper portion of the rib 102 with the angle 160 and support a headlight housing, generally designated 181, which extends rearwardly to the trough 72.

The ridge beam 125 is joined to the lower channel 161 of the cab structure, as shown in Fig. 16, the joint being reinforced by a belt plate 167 which extends completely around the cab structure.

A plurality of ribs 168, 169, 170 and 171, all of which are generally semi-parabolic in front elevation, form the body of the nose, the first two extending from the ridge beam to the side framing angle 147 and the latter two joining the bottom channel 161 of the cab structure with the angle 147 (Fig. 9). Brackets are used where needed to effect the necessary connections between the ribs and the members which they join, i. e. as indicated at 172.

An angle bar 173 secured to the inner faces of the ribs 171, 170, 169 and 168 and the ridge beam 125 form a support for the floor plate 174 of the control cab (see Figs. 16, 18 and 19). A pair of channels 175 and 176 extend rearwardly from the ridge beam and connect with the transverse channel 108 at the rear of the control cab to form intermediate floor supports. The control cab floor, as indicated in Fig. 16, has a horizontal portion 177 and an inclined portion 178, and the angle 173 and channels 175 and 176 are bent accordingly.

Two heavy plates 179 and 180 extend between the channels 175 and 176 and the sides of the ridge beam 125 to reinforce the nose structure in the vicinity of the control cab. (See Figs. 9, 16 and 17). These two stiffening plates, together with the plates 129 and 130 just below, make the nose structure exceedingly strong.

The nose structure is joined with the top sills 90 and 91 through the ribs 102 and 103, carlines 165 and 166, and the cab partition framing, thus completing the front end of the trapezoidal framework. Spacers 182 and 183 between the ribs 102 and 103, together with the outside sheathing, partially indicated at 184 which is securely riveted to the two ribs, assist in transmitting stresses from the nose structure to the top sills and to other longitudinal framing members.

A bumper generally designated 155 (Fig. 16) is secured to the front of the nose structure at a height that will afford the greatest protection, preferably adjacent to the top of the coupler casting 131. It consists of castings 156 and 157, the two being adapted to be riveted or otherwise secured to the nose, and clamping between forwardly extending lips a rubber insert consisting of a relatively soft rubber center 158 covered with a layer of durable non-oxidizing rubber 159.

Beneath the nose structure, is an apron, generally designated 190, which serves the triple purpose of acting as a pilot, preventing air currents from passing beneath the car and furnishing a suitable protected support for automatic train control apparatus. The apron consists of a bottom angle 191 secured by brackets 192 to the side sill 104 (Figs. 16 and 21). At the front and sides, the bottom angle is suspended by supports 193 from the side sills 104 and at the apex of the apron, a small vertical bar 194 connects the bottom angle with the coupler casting 131. A heavy strut 195 braces the entire apron structure and extends from the bottom of the apron apex to the center sill (Figs. 16 and 21) where it is connected by a bracket 196.

The automatic train control apparatus may be mounted on the cross bar 197, and is indicated diagrammatically at 198 in Fig. 21.

C. Engine room framing

The front cross sill 88 comprises a casting having a rather deep center portion for receiving the buff sills 90 and 91 (see Fig. 13). The ends of the cross sills are provided with stepped seats 200 for receiving the cut-out portions 151 of the floor supporting channels 146. The bottom flanges of the channels adjacent to the cut-out portions 151 rest upon wings 201 of the cross sill casting and rivets through the top and bottom flanges of the channels, as well as through their webs, secure the channels to the cross sill.

The extreme ends of the cross sill extend downwardly, as indicated at 202, to receive the side sills 104 and the offset 203 mates with a corresponding offset 154 of the side sill, so that the side sill fits snugly against the end of the cross sill with the horizontal flange 148 engaging the bottom face of the end sill casting.

The rear cross sill 89 comprises a casting having a more or less uniform thickness throughout its length, but is provided with grooved seats 204 for receiving stringers 205 having tongues 206 adapted to engage the grooves in the seats 204. The forward ends of the stringers 205 engage depressed seats 214 and rivets secure the stringers to the two cross sills. Outwardly of the stringer seats 204 are raised platforms 207 upon which the floor stringers 146 rest and at the extreme ends of the casting are small offsets 208 accommodating the corresponding offsets in the side sills 104.

The cross sill 89 is adapted to connect with the main portion of the center sill and, to this end, the top and bottom webs 209 and 210 are extended rearwardly, as best shown in Fig. 16, and are connected by a vertical web 211. The end of the center sill web 92 abuts against the vertical web 211, and splicing plates 212 and 213 (Fig. 14) on opposite sides of the webs join them together. The center sill cover plate 93 overlaps the horizontal web 209 of the cross sill 89 and the center sill bottom plate similarly overlaps the bottom web 210 of the cross sill (see Fig. 16).

The stringers 205 which connect the front and rear cross sills 88 and 89 engage depressed seats 214 in the rear wall of the front cross sill 88 (as best shown in Figs. 11 and 13.)

The opening 215 bounded by the stringers 205 and the front and rear cross sills 88 and 89 is adapted to receive an engine bed, generally designated 216, Fig. 9, consisting essentially of end castings 217 and 218 connected by Z-bars 219 and 220. A body bolster 221 parallel to the end castings 217 and 218 connect the Z-bars at approximately their mid-sections and the bolster carries a body center plate 222 adapted to mate with the truck center plate 223 to provide for pivotal movement between the car truck and the body. The center pin 224 (Fig. 16) passes through the body and truck center plates as usual.

The longitudinal bars 225 which actually support the engine on the bed are shaped and arranged, not only for their girder effect in supporting the engine, but also for their columnar effect along horizontal axes.

This is very important in case of collision, for the columns can transmit the energy of engine inertia through the front cross tie 88, buff sills 90 and 91, and diagonal braces 138 and 139 to the nose of the car, and thus produce a battering ram effect which will materially assist in clearing the track of obstacles.

Each of the cross sill castings 88 and 89 are provided with an inwardly extending ledge (designated 227 on the casting 88, and 228 on the casting 89) which overhangs the opening 215. The bottom faces of the ledges have tongues 229 adapted to fit within grooves 230 in the end castings 217 and 218 of the engine bed and bolts 231 (Fig. 16) secure the bed in place. The end castings of the motor bed have flanges 232 and 233, respectively, which mate with corresponding flanges 234 and 235, respectively, cast integrally with the front and rear cross sills 88 and 89, respectively, so that additional bolts 236 may assist in holding the engine bed in place within the opening 215.

The Z-bars 219 and 220 of the engine bed mate with the stringers 205 and are bolted together by bolts 237 and 238 (Fig. 15) passing through the upper and lower flanges, respectively, of the Z-bars.

The purpose of bolting the engine bed frame to the body framework is so that the car body may be completely separated from the engine 69 and the truck 63 which supports it by merely removing the bolts and disconnecting the controls, water hose, etc., thus leaving the car body free to be raised from the engine and truck.

The stringers 205 are joined at intervals to the floor channels 146 by J-bars 239 (Figs. 9, 10 and 12), and cast brackets 240 (Figs. 9 and 15) of peculiar shape. The brackets have portions 241 which engage the stringers 205, other portions 242 which engage the channeled floor stringers 146, and downwardly extending portions 243 which rest upon the inwardly extending flanges 148 of the side sills (Figs. 15).

The transverse ribs 244 in the vicinity of the engine bed opening 215 terminate at the side sills 104 (Fig. 15) with portions engaging the offsets 154 and lips 245 of the side sills.

The deepened top sills 80 and 81 which form the sides of the overhead trough 72 in the engine room are reinforced laterally by stream-lined struts 246 placed at intervals corresponding to the spacing of the ribs 244. The front end of the trough 72 is made somewhat shallower than the main portion of the trough, as indicated at 247, to provide head-room for entering the control cab 67 (see Fig. 16). The bottom wall 248 of the trough has suitable openings for permitting the exhaust manifolds, generally indicated at 249, to pass upwardly from the engine 69 to the muffler 250 supported by brackets 251, 252 and 253 within the trough (Fig. 15). At the rear of the trough is a vertical partition 254 which separates the main portion of the trough from the duct 255 formed by the top sills 80 and 81 and upper and lower duct plates 256 and 257, respectively (Fig. 5). Openings 258 alongside one of the cooling radiators 73 permit heated air to be passed rearwardly through the duct 255 for use in the car heating system, the subject matter of which is claimed in a companion application. The space 259 between the top duct plate 256 and the roof plate 260 houses spacers 261 which in effect are continuations of the ribs 86. The space 259 is also used for insulation.

If engine fumes contaminate the air forced rearwardly in the duct 255, a duct may be used to bring fresh air through the radiators opposite the openings 258.

Generally speaking, the entire framework is made of aluminum alloy except for such members as the coupler casting 131, the cross sills 88 and 89, the brackets 240, etc, which are cast steel.

It will be understood that the entire leading or motorized section 60 is longitudinally braced by belt rails 262, window stringers 263, deck stringers 264 and roof stringers 265, but these framing members, as well as the entire end assembly (including the end sill, end posts, etc.) are more conveniently described in detail under the section of this specification dealing with the intermediate car section, infra.

INTERMEDIATE CAR SECTION FRAMING

A. *In general*

The framework of the intermediate car section 61 is shown in Figs. 26-36 inclusive. Generally speaking, it exemplifies the framework of the entire car. The cross sectional view of Fig. 29 is typical of any cross section through the car except those taken through the nose, the engine room, or the tail frameworks. The end framework shown in Figs. 30-36, inclusive, is substantially the same as the end framework at the rear of the leading car section 60, and at the front of the trailer car section 62. For convenience of description, however, all the framework shown in Figs. 26-36, inclusive, will be deemed a part of the intermediate car section framing, even though some of the disclosure is equally applicable to the framing of the leading and trailer sections.

The trapezoidal framework, so-called, of the intermediate car section, consists of top sills 275 and 276 supported at their ends by door posts 277 and 278 resting on end sills 279 at the extremities of a center sill 280. All of these structural elements lie substantially along the center line of the car section, in a vertical plane (at least insofar as they enter into the principal force polygon.)

A plurality of ribs 281 join the top sills 275 and 276 with the upper portion of the center sill 280. These ribs are of channel form (Fig. 29) and are provided with flange feet 282 for riveting. The ribs serve as combined carlines, side posts, and floor supporting members (thus eliminating the usual cross bearers and cross ties). Arcuate J-bars 283 give the car section a rounded bottom and complete the ovate rotundate cross sectional shape of the car.

The longitudinal framing members include side sills 284, seat stringers 285, belt rails 286, window header stringers 287, deck stringers 288, and roof stringers 289, all of which have more or less irregular shapes.

Horizontal and diagonal braces 273 and 274 extend between the door end posts 278 and the end rib 281 and end sill 279, respectively, to strengthen the end frame assembly.

The center sill 280 comprises a web plate 290, bottom angles 291 and 292, top channels 293 and 294, top and bottom cover plates 295 and 296, respectively, except in the central portion of the car where struts and diagonal braces 297 and 298, respectively, are substituted for the web plate 290.

The rounded bottom or belly of the car is covered with sheathing 404, which is securely fastened in place so that it may serve as a stress member, particularly in resisting tension and torsion.

B. End framing

The ends of the center sill veer upwardly and are somewhat shallower where they connect with the end sill castings 279. Details of the connection are shown in Figs. 30, 31 and 36.

A vertical web 299 cast as an integral part of the end sill extends rearwardly and abuts against the center sill web plate 290 (Fig. 31). Splice plates 300 and 301 join the web plate 290 with the end sill vertical web 299, the joining rivets being indicated at 302. The top channels 293 and 294 and the bottom angles 291 and 292 overlap the splice plates and strengthen the joint (Figs. 30 and 31). The center sill cover plates 295 and 296 similarly overlap the top and bottom walls 303 and 304, respectively, of the end sill castings (Fig. 30) and engage anti-telescoping plates 305 and 306 extending from side sill to side sill and passing over the cover plates 295 and 296 securing the latter in place (Fig. 36). Fillers 307 and 308 are used at the rear of the end sill casting to provide a solid foundation for the anti-telescoping plates.

The end sill castings 279 each comprise, in addition to the parts already specified, a main body portion 309 flanked by air duct protuberances 310 having partitioned openings 311. At the extreme ends of the casting, the top wall 303 is upturned as indicated at 312 (Figs. 33 and 36) to provide a suitable surface for riveting the end ribs to the end sill casting (Fig. 33). The rib is also secured to the side sills 284 at 313 and 314, and the latter in turn are secured to the end sill casting by rearwardly extending angular projections 315 which engage the side sills in a manner best shown in Fig. 33. The side sills are also joined to the end sill casting indirectly by the lower anti-telescoping plate 306 which extends beyond the end sill casting and is riveted to the angular flanges 316 of the side sills. Jacking pads 336 are provided at the ends of the end sill casting for lifting the car body from the truck.

The nose of the main body portion 309 has an enlargement 317 apertured at 318 to receive a dowel 319 formed in the top face of an inner center plate bracket, generally designated 320 which is secured by bolts 321 to the lower face of the main body portion 309 of the end sill casting. A key 322 relieves the bolts 321 of much of the shearing stress to which they would otherwise be subjected.

The opposed end sill casting, for convenience designated 323 (Fig. 30) of the adjacent car section likewise has an enlargement 324 apertured at 325 to receive a dowel 326 on the upper stepped face of an outer center plate bracket 327 secured by bolts 328 to the end sill casting 323. A key 329 is provided for the same purpose as the key 322.

The outer center plate bracket 327 has a concave upper surface 330 surrounded by a cylindrical wall 331, and the complemental convex bottom face 332 of the inner center bearing bracket 320 is adapted to rest and be supported by the outer center plate bracket (Fig. 30). Both inner and outer center plate brackets 320 and 327 are swivelled on a truck center plate 333 which in turn is supported on a truck bolster generally indicated at 334 (Fig. 32). The several bearing surfaces between the truck center plate 333, the outer center bracket 331, and the inner center bracket 320 are provided with pads 335 of suitable anti-friction material, such for example as Oilite.

The door end posts 277 and 278 are secured to the end sills 279 by box-like castings 340, the bottom walls 341 of which are extended as indicated at 342 to provide a large area for riveting to the end sill casting. The door end posts telescope over the castings 340 and each comprise a plurality of irregularly shaped extruded bars 343, 344, 345, 345', 346, and 347 (Fig. 36) all interfitting and being securely riveted together. The various flanges and ribs reinforce the posts and make them exceedingly strong columns.

The channel 348 in the posts is adapted to interlock with a correspondingly formed collar 349 extending around the duct protuberance 310 and joining with the upturned ends 312 of the top wall 303 of the end sill casting.

In order to make the end assembly exceptionally strong, the castings 340 may be welded to the end sill castings instead of being secured together by rivets. Rivets are used to secure the posts to the box castings 340 as best shown in Fig. 34.

At each end of the car section, the end posts support a top plate 350, preferably of steel, secured at opposite ends to angles 351 fastened to the two end transverse ribs. Cast brackets 352 serve to connect the top sills 275 and 276 with the end posts, as best shown in Figs. 33, 34 and 36. The brackets have a large base 353 adapted to be riveted or welded to the plate 350 and to a box-like casting 354 similar in all respects to the castings 340 carried by the end sill casting, and over which the end posts telescope (Fig. 34). The base 353 is reinforced by vertical gusset webs 355 and a portion 356 of the casting enters the channel 357 of the top sills where rivets unite them together.

Suitable angle brackets 358 reinforce the joint between the top sills and the door end posts on the inside (Fig. 36).

C. Framing between car section ends

At the side door openings 365 and 366 near the rear end of the intermediate car section, the framework is such that longitudinal stresses are brought to the center of the car to be carried by the center sill, the top sills, and some of the longitudinal framing members which are not required to be cut away for the door openings. The center sill 280 has its full depth opposite the door openings (Figs. 26 and 27) to enable it to withstand the extra load which it must carry at this point in the car framing. On opposite sides of the door openings are extra ribs 367 and 368 which differ from the other ribs by extending to the lower portion of the center sill (Fig. 27). These ribs, having a larger radius of curvature, are correspondingly stronger and are fully capable of transmitting the part of the stresses that travel along the side sills 284 inwardly to the center sill.

As will be seen by referring to Fig. 26, the side sills 284 are broken away between the door openings, as are also the seat stringers 285, the belt rail 286 and the window header channel 287.

At the top of the door openings 365 and 366 are door headers or lintels 369 (Fig. 28) which extend between the ribs 367 and 368 and are secured to the deck stringers 285.

Referring now to Fig. 29 which illustrates a typical cross section through the intermediate car section, or either of the other two sections (exclusive of the nose, engine room and tail structures), further detail of the car framework is shown. The top sills 275 and 276 are each equipped with top and bottom outwardly extending flanges 370 and 371, respectively, an intermediate flange 372, and an inwardly extending flange 373. Plates 374 and 375 connect the top sills at the top and bottom, respectively, and another plate 376 secured to the bottom sides of the flanges 373 divides the space between the top sills into a lower space 377 which serves as an overhead longitudinal duct, and an upper space 378 which is used for insulation and houses spacers 379 resting upon and secured to the flanges 373.

The ribs 281 enter the space between the flanges 370 and 372 and are secured to the top sills by rivets 380 which pass through the top cover or roof plate 374, flange 370, and the top wall or web 381 of the ribs, and by rivets 382 passing through the feet 282 of the ribs and the flange 372.

The ribs 281 turn inwardly at the side sills and form cross bearers, or cross ties, supporting various floor stringers, such as a central channel 383, a Z-bar 384, an inverted channel 385, and an irregularly shaped bar 386. The inner ends of the ribs are bevelled so that they may rest upon the top channels 293 and 294 of the center sill and be secured thereto as well as being riveted to the top cover plate 295 through the feet 282 of the ribs.

The central channel 383 is securely united with the top cover plate of the center sill and materially reinforces the center sill.

The J-bars 283 which form the belly of the car are secured to the side sills and the bottom cover plate of the center sill, as best shown in Fig. 29. They are preferably connected to the ribs 281 by struts 395 and 396 to give the car structure greater rigidity.

The floor stringers 383, 384, 385, 386 support the top floor course 387, as best shown in Fig. 50. The inverted channel 385 has seat pedestals 388 secured to it at intervals (Fig. 51), the attachment being effected by rectangular brackets 389 riveted to opposite sides of the channel. The pedestals have arms 390 that are supported by and secured to a flange 391 of a seat sill 392 running longitudinally of the car and having an offset portion 393 that interlocks with a correspondingly formed portion of the seat stringer 285. Suitable seat frames rest upon the pedestals 388, as indicated diagrammatically at 394 (Fig. 50).

The body shell is covered by deck and side sheathing, indicated at 402 and 403, respectively, and bottom sheathing 404, all securely riveted to the shell and consequently serving as an aid to the shell in resisting torsional stresses.

Between the outer sheathing and the interior finish, generally indicated at 405, is insulation 406, as shown in Fig. 50.

Window sills 397 and window headers 398 extend between the ribs 281 wherever there is a window opening and are interlocked with the belt rail and window header channel 286 and 287, respectively, by tongues and grooves, generally indicated at 399. Flanges 400 and 401 on the window sills and the window headers, respectively, provide suitable surfaces for riveting to the ribs.

The side sills 284, the seat sills 392, the seat stringers 285, the belt rails 286 and the window sills 399 tied together as they are by the vertical ribs 281 constitute in effect a heavily reinforced side girder which not only aids the trapezoidal framework of the car body in carrying the main load, but also serves as a rigid beam in resisting side impacts.

In some cases, it may be desirable to avoid the right angle bend of the ribs at the floor level and employ ribs which extend from the top sills to the lower portion of the center sills. The ribs 367 and 368 at the door openings 365 and 366 illustrate the type of rib. If such ribs were employed in place of the ribs 281, it would be necessary to run cross members from the center sill top channels to the side sills to provide support for the floor stringers (Fig. 27).

A particular advantage of the framework which has just been described (that is, the framework between the ends of the car section) is that continuous longitudinal and transverse members are used. In conventional car building, the longitudinal members consist of a plurality of lengths which are riveted or welded between side posts, cross bearers, carlines, etc. In the method of framing herein disclosed, the transverse and longitudinal members are continuous and overlap, and greater strength is, therefore, obtained.

TRAILER SECTION FRAMING a. In general

With the exception of the tail structure, the framing in the trailer section is substantially the same as the framework in the leading and intermediate car sections. The trapezoidal framework may be said to consist of the top sills 410 and 411, end posts 412, end sill 413, center sill 414, and the tail structure, generally designated 415. As in the case of the leading and intermediate car sections, this trapezoidal framework lies substantially along the center line of the car section in a vertical plane.

The center sill 414 is shown in Fig. 38 and in so far as it is identical with the center sill of the intermediate car section, it will be given corresponding reference characters.

The rear end of the center sill 414 has a slightly raised portion 416 and is also somewhat shallower to accommodate the trailer truck 66. This portion of the center sill carries a cast body bolster 417, details of which are shown in Figs. 41–44, inclusive. At the extreme rear end of the center sill is a rear coupler casting 418, details of which are shown in Figs. 45–49, inclusive.

The top sills 410 and 411 are joined to the top channels of the center sill 414 by a plurality of ribs 419 and arcuate J-bars 420 (Fig. 37) join the bottom cover plate of the center sill with the side sills 421 as before.

The construction in the vicinity of the side door opening 422 (a similar opening is in the opposite side of the car) corresponds exactly with the construction around the door openings 365 and 366 of the intermediate car section, and no useful purpose will be served by repeating the description.

b. Tail structure

Top sills 410 and 411 are provided with top and bottom cover plates 423 and 424, and an intermediate plate 425 divides the space between the top sills into a lower space 426, which serves as an overhead duct for ventilation purposes, and an upper space 427 which houses the spacers 428 and in which insulating material is placed to minimize heat exchange between the duct 426 and the exterior of the car. The top sills 410 and 411 terminate slightly in rear of the body bolster 417 and just beyond the door opening 429 on the far side of the car (Fig. 39). Two closely spaced ribs 430 and 431 provide the necessary reinforcement in front of the door opening and two other closely spaced ribs 432 and 433 are provided in rear of the door opening and connect with the body bolster 417. The rib 433 does not reach to the top sill but terminates slightly above the window header 434.

A spinal sill 435, semi-parabolic in side elevation, joins the top sills to the coupler casting. The forward end of the spinal sill telescopes over the angle bracket 436 secured to the spacer 437 lying in the plane of the rib 431 (see Fig. 40).

The rear coupler casting is somewhat similar to the front coupler casting, generally designated 131 and comprises an upstanding portion 438 to which the lower end of the spinal sill is secured (Fig. 47), a vertical gusset web 439 which reinforces the spinal sill connection, a main body portion 440 having a pocket 441 for receiving the coupler 442 pivoted within the pocket by a coupler pin 443, a forwardly extending vertical web 444 for connecting the coupler casting to the center sill, and wings 445 providing suitable faces for securing the ends of the side sills 421 to the casting.

The center sill 414 is spliced to the vertical web 444 of the coupler casting by plates 446 and 447 (Fig. 46) with the ends of the top channels 293 and 294 overlapping the splicing plates and terminating below a flat horizontal web 448 of the coupler casting. The bottom angles 291 and 292 of the center sill likewise overlap the splicing plates and are secured to a lip 449 at the base of the coupler casting. The top cover plate 295 is riveted to the face of the web 448, and the bottom cover plate 296 is riveted to the underside of the lip 449 (Fig. 47).

The wings 445 of the coupler casting have depressed portions 450 which conform with and are riveted to the ends of the side sills 421 (Figs. 45 and 46).

The longitudinal framing members of the trailer car section, including the window header 434, belt rail 451 and the seat sill 452, all, on the side opposite the door, terminate short of the tip of the tail structure, the latter two stopping at the rib 433, and the window header at the rib 453. Bands of sheet metal, however, generally indicated at 454 and 455 are in effect extensions of the belt rail 451 and the seat sill 452, and join with the spinal sill 435 (Fig. 47). The window sill 456 is the only longitudinal framing member with the exception of the side sills (and of course the center sill) that extends to the spinal sill 435.

Truncated ribs 457, 458 and 459 join the center sill with the bands 455, the latter rib, however, extending upwardly to the same height as the rib 433. A rib 460 positioned between the ribs 433 and 453 has the same height as these two last mentioned ribs, but it does not extend inwardly to the center sill (Fig. 39).

A pair of stout cross bearers 461 and 462 are secured by brackets 463 to the side sills and to the top channels 293 and 294 of the center sill.

A plurality of relatively light ribs 464 secured to the spinal sill 435 by angle brackets 465 and to the side longitudinal framing members 434 and 456 complete the shell of the tail structure and serve to transmit longitudinal stresses travelling forwardly along the spinal sill to the side framing members. These relatively light ribs are increasingly inclined to the rear, that is the rib closest to the top sills 410 and 411 is more nearly vertical than the ribs to the rear and the last of the ribs 464 is practically horizontal (see Fig. 39).

The body bolster 417 consists of a casting having front and rear vertical webs 470 and 471 that are spliced to the center sill 414 in the same manner as the end sills are joined with the center sills. The top web 472 of the bolster broadens out, as indicated at 473, and then narrows again and merges with a mouth 474 adapted to be secured to the inner face of the side sill 421 (Fig. 44). The ribs 432 and 433 are riveted on opposite sides of the mouth, as best shown in Fig. 41. The bottom web 475 of the bolster is somewhat narrower than the top web, and vertical reinforcing webs 476 join the top and bottom webs. The bolster is also provided with integral downwardly extending legs 477 which serve as side bearings and coact with the truck bolster 478. The bolster is equipped with a body center plate 479 which rests upon a truck center plate 480 secured to the top face of the bolster 478. Preferably a pad 481 of self-lubricating material is interposed between the body and truck center plates to reduce friction. A center pin 482 passes through the body bolster 417 and provides the swivel connection between the trailer truck 66 and the car body.

At the ends of the bolster are jacking pads 483, as usual.

Throughout this specification, many of the structural elements have been designated by their characteristic shapes, as for example, channels, angles, Z-bars, etc. This has been done for convenience of description only, for obviously other shapes can be used, if desired.

An effort has been made to show as much of the riveting in the drawings as possible, but in some cases, it is omitted for the sake of clarity or for some other reason. Generally speaking, all abutting framing members are riveted or welded together and the omission of a specific showing in the drawings is not necessarily to be interpreted as meaning that the parts are not riveted or welded together at that particular place. Wherever possible, the rivets are placed along the tongue and groove joints so as to relieve the rivets of shearing strain.

Summarizing, the outstanding features of the framing, according to this invention are:

1. Trapezoidal framework lying substantially in a vertical plane along the center line of the car for carrying the major portion of the car load.

2. Supplemental framework forming the car shell and adding a factor of safety to the trapezoidal framework.

3. Nose and tail framework connecting the top and center sills at their forward and rear ends, respectively, in a manner that gives strength, aerodynamic lines and pleasing appearance.

4. Continuous longitudinal framing members overlapped with the transverse members for greater strength.

5. The use of extruded aluminum beams of various cross sectional shapes providing broad areas for riveting, flanged reinforcements where needed, and interlocking tongues and grooves, all with a minimum of weight.

6. Integral carlines, side posts and cross supports for the floor.

7. A sturdy girder construction consisting of the side sills, seat stringer, seat sill and the belt rail tied together by the ribs for resisting side impacts.

However, the particular mention of certain outstanding features is not to be construed as excluding other novel and useful details of arrangement disclosed in this application.

Although door end posts are illustrated and described as forming the vertical members in the trapezoidal framework, corner end posts (i. e. at the ends of the end sills) might be used in their stead, although this would probably require the use of a heavier top plate construction to carry the stresses from the top sills outwardly to the corner end posts, and for that reason would be less desirable.

What I claim, therefore, is:

1. In a railway car, substantially rigid trapezoidal framework having its plane of resultant stresses lying substantially in the vertical plane through the longitudinal center line of the car and being of sufficient strength to carry the greater part of the car load, said framework including a top sill, a center sill, and means including an end post joining the top and center sills at one end, and a composite nose framework joining the top and center sills at the other end, said end post and nose framework constituting the main support for supporting said top sill from said center sill.

2. In a railway car, substantially rigid trapezoidal framework having its plane of resultant stresses lying substantially in the vertical plane through the longitudinal center line of the car and being of sufficient strength to carry the greater part of the car load, said framework consisting of a top sill, a center sill, and an end post joining the top and center sills at one end, and a composite nose framework joining the top and center sills at the other end, said center sill having a horizontal, rectangular frame intermediate its ends.

3. In a railway car, substantially rigid trapezoidal framework having its plane of resultant stresses lying substantially in the vertical plane through the longitudinal center line of the car and being of sufficient strength to carry the greater part of the car load, said framework consisting of a center sill, end sills at opposite ends of the center sill, a pair of end door posts rising from each end sill, and a box girder rigidly united with and supported by the end posts.

4. In a railway car, substantially rigid trapezoidal framework having its plane of resultant stresses lying substantially in the vertical plane through the longitudinal center line of the car and being of sufficient strength to carry the greater part of the car load, said framework including a top sill, a center sill, and an end post joining the top and center sills at one end, and tail framework tapering to the rear for joining the top and center sills at the other end.

5. In a rail car of the class described, nose framework comprising a heavily reinforced ridge beam substantially semi-parabolic in side elevation, a longitudinal framing member substantially parabolic in plan extending rearwardly from both sides of the ridge beam adjacent to its base, and one or more ribs connecting the ridge beam with portions of the longitudinal framing member at intervals along the sides of the sides of the car.

6. In a rail car of the class described, nose framework comprising a heavily reinforced ridge beam, longitudinal side framing members substantially semi-parabolic in plan extending rearwardly from opposite sides of the ridge beam adjacent to its base, a cross sill joining the side framing members transversely of the car, one or more ribs connecting the ridge beam with the side framing members, and a buff sill between the cross sill and lower portion of the ridge beam.

7. In a rail car of the class described, a top and center sill, and means for connecting the forward ends of said sills to form a rigid structure, such means comprising nose framework including a heavily reinforced ridge beam, longitudinal side framing members substantially semi-parabolic in plan extending rearwardly from opposite sides of the ridge beam adjacent to its base, a cross sill joining the side framing members transversely of the car, one or more ribs connecting the ridge beam with the side framing members, and a buff sill between the cross sill and lower portion of the ridge beam, and cab framework in the upper portion of the nose united with the top sill.

8. In a rail car of the class described, tail framework comprising a center sill, a top sill, and a spinal sill substantially semi-parabolic in side elevation joining the rear ends of the top and center sills, and ribs radiating from the spinal sill for transversely operatively connecting the spinal sill with the center sill.

9. In a rail car of the class described, tail framework comprising a center sill, a top sill, and a spinal sill substantially semi-parabolic in side elevation joining the rear ends of the top and center sills, and ribs radiating from the spinal sill for transversely operatively connecting the spinal sill with the center sill, the transverse planes through said ribs being increasingly inclined from the transverse vertical plane as they approach the rear of the car.

10. In a railway car, trapezoidal framework including a top sill, having its plane of resultant stresses lying substantially in the vertical plane through the longitudinal center line of the car, a center sill, the top sill being supported mainly from its ends, said framework being of sufficient strength to carry the greater part of the car load, and curved ribs radiating from the top sill and serving as carlines and side posts in the car framing.

11. In a railway car, trapezoidal framework including a top sill, having its plane of resultant stresses lying substantially in the vertical plane through the longitudinal center line of the car, a center sill, the top sill being supported mainly from its ends, said framework being of sufficient strength to carry the greater part of the car load, curved ribs radiating from the top sill and serving as carlines and side posts in the car framing, and continuous longitudinal framing members connecting the ribs at intervals.

12. In a railway car, trapezoidal framework including a top sill, having its plane of resultant stresses lying substantially in the vertical plane through the longitudinal center line of the car, a center sill, the top sill being supported mainly from its ends, said framework being of sufficient strength to carry the greater part of the car load, curved ribs radiating from the top sill and serving as carlines and side posts in the car framing, and continuous longitudinal framing members connecting the ribs at intervals, said longitudinal framing members including a side sill having a reinforcing flange adapted to oppose bending stresses in a horizontal plane.

13. In a railway car, trapezoidal framework including top and center sills having its plane of resultant stresses lying substantially in the vertical plane through the longitudinal center line of the car and being of sufficient strength to carry the greater part of the car load, means for connecting said top sill and center sill at the opposite ends thereof, and curved ribs connecting the top and center sills at intervals and serving as combined carlines, side posts and cross ties.

14. In a railway car, trapezoidal framework including a top sill and a deep center sill having its plane of resultant stresses lying substantially in the vertical plane through the longitudinal center line of the car and being of sufficient strength to carry the greater part of the car load, means for connecting said top sill and center sill at the opposite ends thereof, curved ribs connecting the top sill at intervals with the upper portion of the center sill, longitudinal framing members including side sills for supporting the ribs in vertical planes, side understructure between the end sills and the lower part of the center sill forming a rounded belly for the car.

15. In a rail car of the class described, a coupler casting, a ridge beam extending upwardly and rearwardly from the coupler casting, side sills extending laterally and rearwardly from said casting, and a buff sill extending rearwardly from the casting, said beam and sills being securely anchored to the coupler casting.

16. In a rail car of the class described, body framework including a rounded nose comprising a coupler casting, a ridge beam extending upwardly and rearwardly from the coupler casting, side sills, each substantially semi-parabolic in plan, joined to the coupler casting extending rearwardly along the sides of the car, and a buff sill secured to the coupler casting and extending rearwardly along the center line of the car.

17. In a rail car of the class described, body framework including a rounded nose comprising a coupler casting, a ridge beam extending upwardly and rearwardly from the coupler casting, side sills, each substantially semi-parabolic in plan, joined to the coupler casting extending rearwardly along the sides of the car, and a buff sill secured to the coupler casting and extending rearwardly along the center line of the car, and additional framing members completing the nose structure and forming a shell which is substantially parabolic in horizontal and transverse section.

18. In a rail car of the class described having a rounded nose, the combination of a ridge beam, a buff sill, means for joining the ridge beam to the buff sill, a reinforcing bar connecting the ridge beam to the buff sill at points which with the first mentioned point of connection form the apices of a triangle, and a vertical plate extending between two sides of the triangle thus formed.

19. In a rail car of the class described having a rearwardly sloping nose, the combination of space framework forming the shell of the nose including a ridge beam, and floor supporting members joined with and inclined downwardly from the ridge beam and then extending horizontally and joining with other portions of the space framework.

20. In a rail car of the class described, trapezoidal framework having its plane of resultant stresses lying substantially in the vertical plane through the longitudinal center line of the car and being of sufficient strength to carry a greater part of the car load, said framework including a pair of top sills the forward portions of which are apertured and form the sides of a trough for exhausting air from the car interior.

21. In a rail car of the class described, a pair of top sills constituting the main longitudinal compression members in the upper portion of the body framework, spacers joining the tops of said sills, a bottom plate connecting the bottoms of the top sills and a top plate connecting the top sills below the spacers.

22. In a railway car, trapezoidal framework having its plane of resultant stresses lying substantially in the vertical plane through the longitudinal center line of the car and being of sufficient strength to carry the greater part of the car load, outwardly bowed ribs extending transversely between the top and bottom of said framework, side sills joining the ribs together substantially at floor level, belt rails joining the ribs together substantially at window level, said side sills and belt rails forming the bottom and top members respectively of beams on opposite sides of the car for resisting side impacts and assisting the trapezoidal framework in carrying the car load.

23. In a rail car of the class described, a center sill consisting of a main beam portion, a buff sill portion, and a rectangular frame between the two portions, said frame including a pair of cross sills and longitudinal stringers inwardly of the sides of the car for connecting the ends of the cross sills, said main beam portion terminating at the adjacent cross sill.

24. In a rail car of the class described, having a rounded nose, the combination of a coupler casting rigidly connected to said nose, a buff sill extending rearwardly from the coupler casting, space framework including a ridge beam, side sills, and curved ribs connected together and forming the shell of the nose, an apron positioned below the coupler casting and serving as a pilot, and means for supporting said apron below said nose.

25. In a car having a center sill, a pair of side sills and an upwardly extending beam meeting at a point, the combination therewith of a coupler casting adapted to unite said members, said casting comprising a body portion having a pocket for receiving a coupler, a vertical web for attachment to the car center sill, lateral wings having rounded outer faces for receiving the correspondingly curved side sills, and an upwardly extending web adapted to be secured to the beam.

26. In a railway car having a roof, a floor, side and end walls, a frame in the form of a closed loop comprising a lower portion, an upper portion, means for supporting said upper portion from its ends from said lower portion, a plurality of substantially vertically disposed ribs spaced lengthwise to the car between the ends thereof and tying in at the bottom and top to the lower and upper portions, respectively, of the loop and formed to lie substantially in the planes of the car roof and side, said ribs being the only vertical struts between the upper and lower portions of the loop in the region between the car ends, said upper and lower portions extending along said roof and floor, respectively, and connected thereto, and spaced inwardly from said side walls, said frame constituting the main supporting structure of said car for carrying the major portion of the load thereof.

27. In a railway car having a framework comprising a box girder along the roof of the car at the longitudinal center line thereof and a main sill along the bottom wall at the longitudinal center line thereof, the combination of door posts at each end of the car, and means for rigidly connecting said posts, box girder and sill together, each of said posts comprising a box column having one end wall, a plurality of reinforcing vertically extending ribs lying in planes extending longitudinally of the car and having its opposite end wall forming an obtuse angle with one side wall whereby said post is reinforced against stresses acting longitudinally of the car.

28. In a framework for railway cars, a pair of door posts extending upwardly at each end of the car, connecting means for rigidly connecting together the ends of said posts at each end of the car, means extending longitudinally of the car at its upper and lower portion for rigidly connecting said connecting means together, each of said door posts comprising a box column having reinforcing ribs on three sides and having its remaining side in the form of an acute angle, the apex of said angle being directed longitudinally of the car toward an end thereof.

29. In a railway car, a center sill and a box girder in the vertical plane of the longitudinal center line of the car, a pair of box columns forming door posts at each end of said car, means for rigidly connecting the upper ends of said columns to said box girder, and means for rigidly connecting the lower ends of said columns to said center sill, each of said columns comprising elements having interlocking connections forming reinforcing ribs on the side walls of said columns, one of the remaining walls constituting an end wall having an intermediate vertically extending strengthening rib and forming with said side walls reinforcing ribs extending longitudinally of the car and the remaining wall forming an acute angle pointing toward the adjacent end of the car.

30. In a rail car construction, an end sill carrying an outwardly offset bearing, a roof structure adapted to take substantial compression and tension loads and a vertically extending rigid arm relatively deep longitudinally of the car rigidly secured to said sill and having its upper end connected to said roof structure to transmit eccentric loading on said sill into the roof structure.

31. In a rail car structure, an end sill carrying an outwardly offset bearing, roof and side wall truss structures, and a strongly reinforced end wall structure rigidly tied into said sill, roof and side wall structures and adapted through its connection with the roof and side wall structures, to distribute a substantial portion of the loading stresses from said bearing into the roof and side wall structures.

32. A railway vehicle body mounted on wheeled trucks and provided with a collision front extending from a horizontal region vertically above the trucks a major part of the distance between the trucks and the top of the body, which front is divergent rearwardly in horizontal cross section a major portion of the width of the body and throughout the specified vertical extent has rearward inclination upwardly, which body is further provided with a horizontally disposed and forwardly extending underframe portion which supports and braces against collisions the lower part of the said collision front, and a vertically extending massive collision beam structure founded on said underframe portion supporting and bracing said collision front and constructed and arranged to resist collision shocks upon that portion of said front upwardly of the underframe.

33. In an end construction for railway cars, an end sill having a short arm projecting forwardly beyond the end of the car and forming a bearing for the car, a roof structure arranged to withstand substantial longitudinal forces, and a long vertically extending arm of longitudinally deep section rigid with the sill and tying into the roof structure, whereby a substantial part of the eccentric loading on the end sill is transmitted into the roof structure.

34. In an end construction for railway cars, an end sill carrying a bearing member offset downwardly and forwardly of said sill, a roof structure adapted to withstand substantial longitudinal forces, said sill being rigidly connected to a vertical beam structure of longitudinally deep section extending to the roof of the car and tying into the roof structure.

35. In an end construction for railway cars, an end sill having a short arm projecting forwardly thereof and carrying the center bearing for the car, a roof structure acting as a girder to take longitudinal forces, and a pair of longitudinally deep vertically extending arms rigidly secured to the end sill and framing the opposite sides of a doorway opening in the end of the car and extended to the roof and tying into the roof structure.

36. In an end construction for railway cars, an end sill having a short arm projecting forwardly and carrying the center bearing for the car, an arm rigidly secured to the sill and extending rearwardly and tying into light weight underframing and another arm longitudinally deep also rigidly secured to the sill and extending vertically and tying into the roof truss framing, whereby forces tending to rotate the end sill are distributed between the underframe and roof structures.

37. In a rail car construction, an end sill casting carrying an outwardly offset bearing, said end sill having a rearward projection tying directly into light weight underframing of the car, vertically extending longitudinally deep arms tying directly in the vertical members framing the sides of a door opening at the end of the car and additional vertical arms outwardly of the first named vertical arms additionally tying the sill into the vertical end framing of the car.

38. In a rail car structure, an end sill carrying an outwardly offset bearing, a roof truss structure arranged to take substantial longitudinal forces, a vertically extending longitudinally deep rigid beam structure rigidly secured to the sill and tying into the roof structure at its upper end, said upwardly extending beam structure being adapted to carry the major portion of the bending load to which the sill is subjected due to the offset position of the bearing.

MARTIN P. BLOMBERG.

CERTIFICATE OF CORRECTION.

Patent No. 2,247,273.

June 24, 1941.

MARTIN P. BLOMBERG.

It is hereby certified that error appears in the printed specification of the above numbered patent requiring correction as follows: Page 10, first column, lines 33 and 34, claim 14, for the words "side understructure between the end sills" read --and understructure between the side sills--; and that the said Letters Patent should be read with this correction therein that the same may conform to the record of the case in the Patent Office.

Signed and sealed this 29th day of July, A. D. 1941.

(Seal)

Henry Van Arsdale,
Acting Commissioner of Patents.